United States Patent
Seo et al.

(10) Patent No.: US 10,005,179 B2
(45) Date of Patent: Jun. 26, 2018

(54) WALKING ASSISTANT DEVICE AND METHOD OF CONTROLLING WALKING ASSISTANT DEVICE

(71) Applicant: Samsung Electronics Co., Ltd., Suwon-Si, Gyeonggi-Do (KR)

(72) Inventors: Kee Hong Seo, Seoul (KR); Ju Suk Lee, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 410 days.

(21) Appl. No.: 14/591,755

(22) Filed: Jan. 7, 2015

(65) Prior Publication Data

US 2015/0190923 A1 Jul. 9, 2015

(30) Foreign Application Priority Data

Jan. 9, 2014 (KR) ........................ 10-2014-0002951

(51) Int. Cl.
*A61H 3/00* (2006.01)
*A61H 1/02* (2006.01)
(Continued)

(52) U.S. Cl.
CPC ............ *B25J 9/0006* (2013.01); *A61H 1/024* (2013.01); *A61H 1/0244* (2013.01); *A61H 1/0266* (2013.01); *A61H 3/00* (2013.01); *B25J 13/085* (2013.01); *A61H 2201/1207* (2013.01); *A61H 2201/1246* (2013.01);
(Continued)

(58) Field of Classification Search
CPC .. B25J 9/0006; B25J 13/085; A61F 2002/701; A61H 3/00; A61H 2201/50; A61H 2201/5005; A61H 1/001; A61H 1/024; A61H 1/0244; A61H 1/0266; A61H 2230/605; A61H 2201/1207; A61H 2201/165; A61H 2201/5038;
(Continued)

(56) References Cited

U.S. PATENT DOCUMENTS 8,034,005 B2 * 10/2011 Yasuhara ............... B25J 9/0006
601/35
8,048,008 B2 * 11/2011 Yasuhara ................. A61H 3/00
601/35
(Continued)

FOREIGN PATENT DOCUMENTS

JP 2009066698 A 4/2009
KR 20130048479 A 5/2013
KR 20130056026 A 5/2013

*Primary Examiner* — Quang D Thanh
(74) *Attorney, Agent, or Firm* — Harness, Dickey & Pierce, P.L.C.

(57) ABSTRACT

A walking assistant device may calculate a walking cycle by measuring only motion of a specific joint without a force/torque sensor (F/T sensor) of a foot, and a method of controlling the walking assistant device. The method may include measuring motion of a hinge to which different support frames are connected; overlapping a reference trajectory corresponding to the measured motion and modulation trajectories that have been modulated from the reference trajectory; correcting the overlapping trajectory to correspond to the measured motion; determining assistant torque corresponding to a phase of the corrected trajectory; and providing the determined assistant torque to the support frame.

16 Claims, 19 Drawing Sheets

(51) Int. Cl.
  *B25J 9/00* (2006.01)
  *B25J 13/08* (2006.01)
(52) U.S. Cl.
  CPC .. *A61H 2201/164* (2013.01); *A61H 2201/165* (2013.01); *A61H 2201/1628* (2013.01); *A61H 2201/501* (2013.01); *A61H 2201/5007* (2013.01); *A61H 2201/5038* (2013.01); *A61H 2201/5061* (2013.01); *A61H 2201/5069* (2013.01); *A61H 2201/5084* (2013.01); *A61H 2230/605* (2013.01)
(58) Field of Classification Search
  CPC .... A61H 2201/1628; A61H 2201/1246; A61H 2201/5007; G06F 1/0321
  See application file for complete search history.

(56) References Cited

U.S. PATENT DOCUMENTS

| | | | |
|---|---|---|---|
| 2005/0177080 A1* | 8/2005 | Yasuhara | A61B 5/112 |
| | | | 602/16 |
| 2009/0062884 A1 | 3/2009 | Endo et al. | |
| 2010/0113986 A1 | 5/2010 | Ashihara et al. | |
| 2010/0114330 A1 | 5/2010 | Shishido | |
| 2010/0130894 A1 | 5/2010 | Ikeuchi | |
| 2010/0132464 A1 | 6/2010 | Yasuhara | |
| 2010/0198116 A1 | 8/2010 | Hirata et al. | |
| 2010/0204621 A1 | 8/2010 | Ashihara et al. | |
| 2010/0210980 A1 | 8/2010 | Kudoh | |
| 2010/0234775 A1 | 9/2010 | Yasuhara et al. | |
| 2010/0234777 A1 | 9/2010 | Yasuhara et al. | |
| 2010/0324699 A1* | 12/2010 | Herr | A61F 2/66 |
| | | | 623/27 |
| 2011/0028871 A1 | 2/2011 | Shishido | |
| 2011/0028874 A1 | 2/2011 | Hiki et al. | |
| 2011/0033835 A1 | 2/2011 | Endo et al. | |
| 2011/0184225 A1* | 7/2011 | Whitall | A63B 69/0028 |
| | | | 600/28 |
| 2011/0224586 A1 | 9/2011 | Ikeuchi | |
| 2011/0257587 A1 | 10/2011 | Ikeuchi et al. | |
| 2011/0264015 A1* | 10/2011 | Endo | A61H 1/0255 |
| | | | 601/35 |
| 2011/0288453 A1 | 11/2011 | Endo | |
| 2011/0301756 A1* | 12/2011 | Yoshiike | B62D 57/032 |
| | | | 700/253 |
| 2011/0306907 A1 | 12/2011 | Ashihara et al. | |
| 2012/0016277 A1 | 1/2012 | Ebihara et al. | |
| 2012/0016278 A1* | 1/2012 | Nakashima | A61H 1/024 |
| | | | 601/34 |
| 2012/0215140 A1 | 8/2012 | Hirata et al. | |
| 2012/0226203 A1* | 9/2012 | Nakashima | A61H 3/00 |
| | | | 601/34 |
| 2012/0310122 A1* | 12/2012 | Endo | A61H 1/0244 |
| | | | 601/35 |
| 2015/0142130 A1* | 5/2015 | Goldfarb | A61H 1/024 |
| | | | 623/25 |
| 2015/0158175 A1* | 6/2015 | Kim | B25J 9/0006 |
| | | | 700/261 |
| 2015/0190250 A1* | 7/2015 | Braun | A61F 2/60 |
| | | | 623/25 |
| 2017/0354529 A1* | 12/2017 | Han | A61H 1/024 |

* cited by examiner

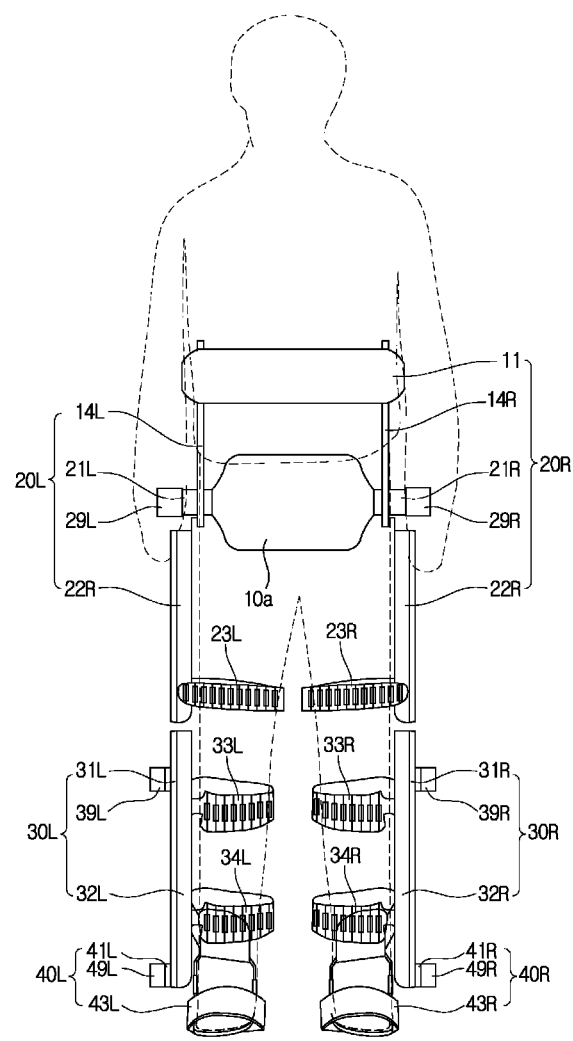

WALKING ASSISTANT DEVICE AND METHOD OF CONTROLLING WALKING ASSISTANT DEVICE

CROSS-REFERENCE TO RELATED APPLICATION

This application claims the benefit of Korean Patent Application No. P2014-2951, filed on Jan. 9, 2014 in the Korean Intellectual Property Office, the entire disclosure of which is incorporated herein by reference.

BACKGROUND

1. Field

Example embodiments relate to a walking assistant device that is configured to attach to a wearer's body and provides force necessary for walking or an exercise effect on the wearer's muscles, and a method of controlling the walking assistant device.

2. Description of the Related Art

Research and development of human body assistant devices for assisting a human body are being actively performed. The human body assistant devices are used for various purposes of, for example, military, industry, rehabilitation, and welfare.

A walking assistant device is a type of human body assistant device that aids walking-impaired persons for various reasons such as weak leg muscle strength so that they may walk. A human may have trouble walking due to congenital reasons such as genetic defects or acquired reasons such as diseases or accidents.

In addition, as an aging society emerges, the walking assistant device may be used to assist the elderly having weak muscle strength with movement, or to enhance muscle strength or muscles through exercise in addition to physical therapy or rehabilitation training.

SUMMARY

Example embodiments provide a walking assistant device, and/or a method of controlling the walking assistant device. In some example embodiments, the walking assistant device aids a wearer with walking by measuring only motion of a specific joint and calculating a current walking phase using the measured motion of the joint without using a force/torque sensor (F/T sensor) of a foot in order to minimize the number of sensors.

In some example embodiments, the walking assistant device may include a support frame unit having a first support frame and a second support frame, which are connected by a hinge; a detecting unit provided in the hinge and configured to measure joint motion; a control unit configured to overlap a reference trajectory corresponding to the measured motion and modulation trajectories that have been modulated from the reference trajectory, correct the overlapping trajectory to correspond to the measured motion, and determine assistant torque corresponding to a phase of the corrected trajectory; and a power unit configured to provide the determined assistant torque to the support frame.

The walking phase calculating unit may overlap the measured motion and reference motion corresponding to the measured motion as a first overlapping trajectory and a second overlapping trajectory, respectively, through trigonometric functions, correct the first overlapping trajectory and the second overlapping trajectory to correspond to the measured motion and the reference motion, respectively, and then determine a walking phase by comparing the corrected first overlapping trajectory and the corrected second overlapping trajectory The walking assistant device may be selectively positioned on a hip, a knee, and an ankle. When the device is positioned on two or more regions among them and assists with walking, a trajectory of one region among them may be measured to calculate the walking phase, and the calculated walking phase may be used for the other regions to provide assistant torque.

The walking assistant device may measure a walking acceleration, a walking speed, and a slope of the ground using the detecting unit or may calculate them using measured joint motion. The assistant torque may be determined by a method of using assistant torque data preset to correspond to a corrected trajectory. Also, the method of using assistant torque data preset to correspond to a corrected trajectory may use assistant torque data related to a walking speed, assistant torque data related to a slope of the ground, assistant torque data related to an age group, assistant torque data related to sex, assistant torque data related to a body weight, reverse assistant torque data for implementing an exercise effect on muscles, and assistant torque data that is updated to data about a current wearer.

Also, the reference trajectory may be updated to data in which joint motion measured in previous walking is sampled and an ensemble average of walking phases of the sampled joint motions is stored.

Other example embodiments are directed to a method of controlling a walking assistant device.

In some example embodiments, the method may include measuring motion of a hinge to which different support frames are connected; overlapping a reference trajectory corresponding to the measured motion and modulation trajectories that have been modulated from the reference trajectory; correcting the overlapping trajectory to correspond to the measured motion; determining assistant torque corresponding to a phase of the corrected trajectory; and providing the determined assistant torque to the support frame by a power unit.

BRIEF DESCRIPTION OF THE DRAWINGS

These and/or other aspects of the example embodiments will become apparent and more readily appreciated from the following description of the embodiments, taken in conjunction with the accompanying drawings of which:

FIG. 1C is a rear view of the walking assistant device according to some example embodiments;

DETAILED DESCRIPTION

Figure 1A:
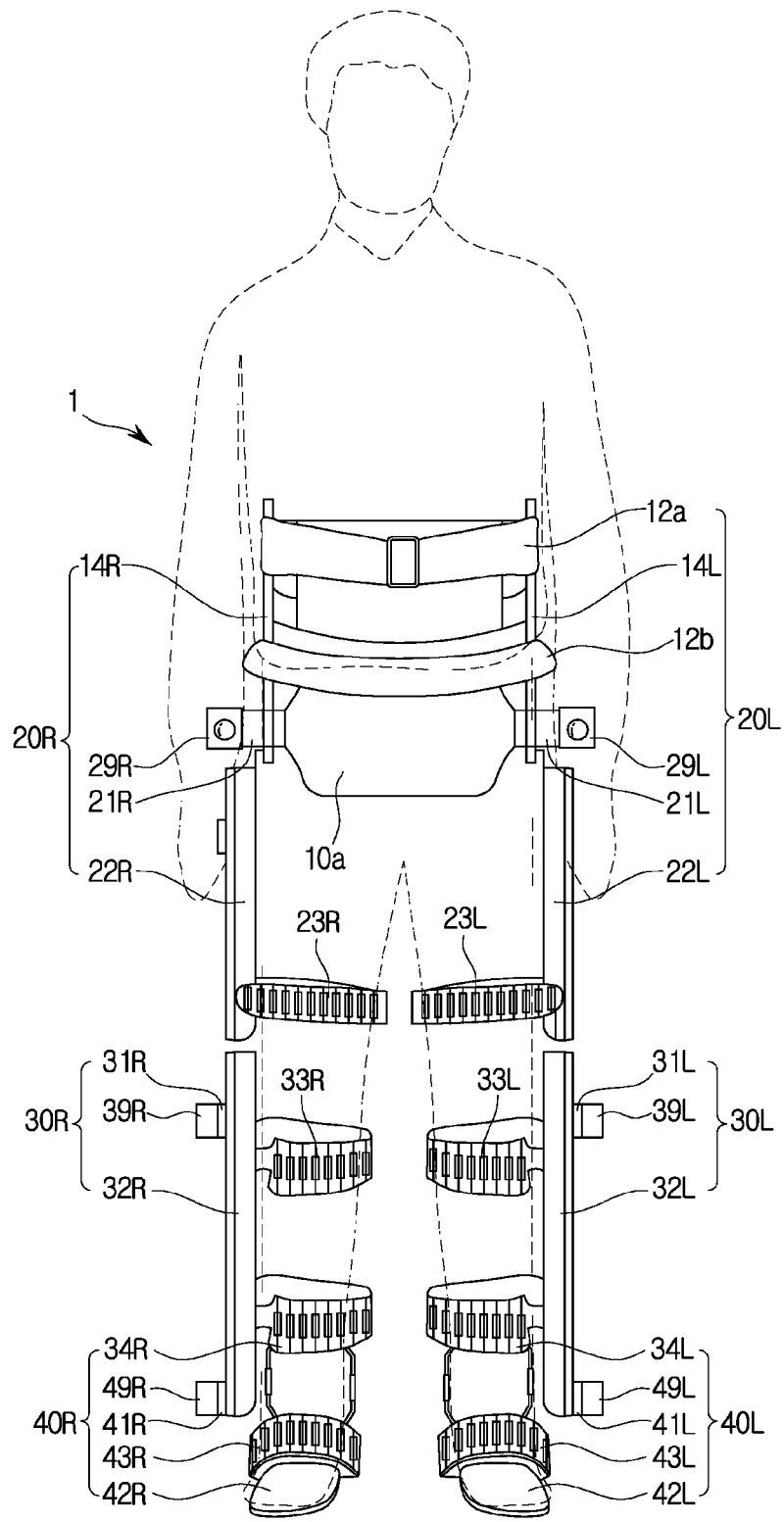
FIG. 1A is a front view of a walking assistant device according to some example embodiments.

Hereinafter, in order to facilitate understanding and reproduction by those skilled in the art, example embodiments will be described in detail with reference to the accompanying drawings. When it is determined that detailed explanations of related well-known functions or configurations unnecessarily obscure the gist of the example embodiments, the detailed description thereof will be omitted.

Terms used in this specification are selected by considering functions in the example embodiment and meanings may vary depending on, for example, a user or operator's intentions or customs. Therefore, in the following example embodiments, when terms are specifically defined, the meanings of terms should be interpreted based on those definitions, and otherwise, should be interpreted based on general meanings recognized by those skilled in the art.

Also, although configurations of selectively described aspects or selectively described example embodiments in this specification are illustrated as a single integrated configuration in the drawings, unless otherwise described, it should be understood that these may be freely combined with each other as long as there is no apparent technological contradiction of such combinations for those skilled in the art.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, a walking assistant device according to some example embodiments will be described with reference to the accompanying drawings.

Figure 1B:
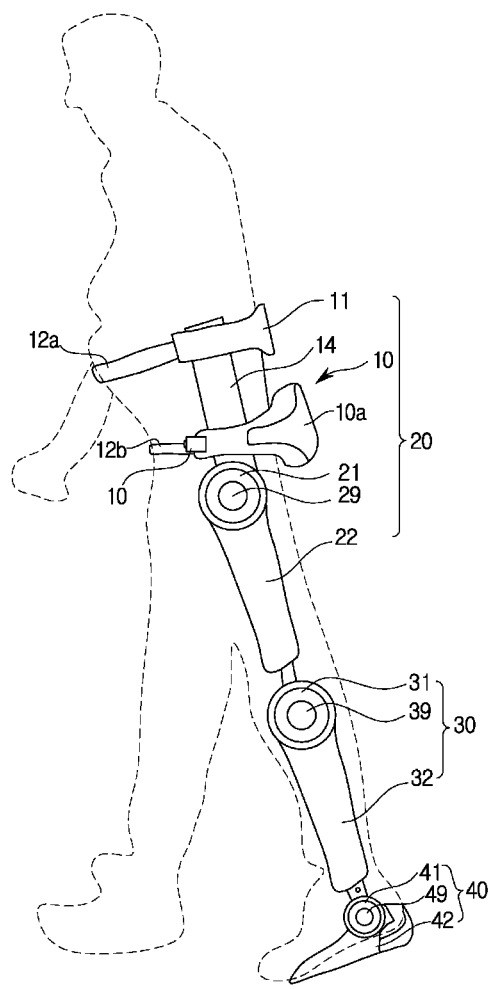
FIG. 1B is a side view of the walking assistant device according to some example embodiments.

FIGS. 1A, 1B, and 1C are a front view, a side view, and a rear view of a walking assistant device according to some example embodiments.

As illustrated in FIGS. 1A, 1B, and 1C, a walking assistant device 1 may include a main body unit 10 and walking assistant units 20, 30, and 40.

The main body unit 10 may include a housing 10a capable of including various components therein.

The housing 10a may provide functions of safely protecting various components to be included and stably fixing the various components. The housing 10a may include a control unit (e.g. a controller) configured to process various signals, such as a central processing unit (CPU) or a graphic processing unit (GPU), a printed circuit board (PCB), and the like therein. Various types of storage devices may also be included, as necessary.

The control unit included in the housing 10a may include the CPU, the GPU, and the like. The CPU may include a module configured to calculate a walking phase such as a particularly shaped adaptive oscillator (PSAO) or a phase compensated adaptive oscillator (PCAO), an assistant torque determining unit configured to determine assistant torque corresponding to the calculated walking phase, and the like.

A type of the CPU may be a microprocessor. The microprocessor is a processing unit in which an arithmetic logic calculator, a register, a program counter, a command decoder, a control circuit, and the like are installed in at least one silicon chip. The CPU may generate a control signal for controlling operations of the walking assistant units 20, 30, and 40, and deliver the generated control signal to the walking assistant units 20, 30, and 40.

The CPU may perform signal processing for correcting a reference angle trajectory based on joint motion of a joint measured while a wearer walks, signal processing for determining assistant torque, signal processing for calculating a walking speed and a slope of the wearer's upper body, and signal processing for converting and updating previously measured joint motion to a reference trajectory.

The GPU refers to a processing unit configured mainly to process information related to graphics in the microprocessor. The GPU may assist with a graphic processing function of the CPU or independently perform graphic processing. The GPU may perform signal processing for displaying results of a current walking phase, provided assistant torque, a walking speed, a slope of the wearer's upper body, and an electromyography (EMG) pattern.

The PCB is a board on which a predetermined circuit is printed. The CPU, the GPU, and various storage devices may be installed in the PCB. The PCB may be fixed in an inner side surface of the housing 10a and provide a function of stably fixing the CPU and the like.

The housing 10a may include various storage devices therein. The storage device may include a magnetic disk storage device that stores data by magnetizing a magnetic disk surface and a semiconductor memory device that stores data using various types of memory semiconductors. The storage device may also store currently measured joint motion, a reference trajectory, and the like.

In addition, the housing 10a may further include a power source for supplying power to the various components in the housing or the walking assistant units 20, 30, and 40.

In addition, the housing 10a may further include an actuator for driving or controlling operations of the walking assistant units 20, 30, and 40.

In some example embodiments, the main body unit 10 may further include a waist supporting unit 11 configured to support the wearer's waist. The waist supporting unit 11 may have a shape of a curved flat plate for supporting the wearer's waist.

In addition, the main body unit 10 may further include at least one of fixing units 12a and 12b for fixing the wearer and the housing 10a or the waist supporting unit 11. As at least one of the fixing units 12a and 12b, various types of units that can fix the housing 10a and the like on a waist, a hip, and the like may be used. For example, at least one of the fixing units 12a and 12b may include a band having elasticity or various types of straps.

In some example embodiments, joint motion detecting units 29, 39, and 49 may measure a joint angle, a walking speed, a walking time, a joint angular velocity, a slope of the wearer's upper body, an electrical signal in a muscle, a slope of the ground, and the like. Also, the joint motion may also be represented as motion of a hinge located between different support frames.

The joint motion detecting units 29, 39, and 49 may be located at a hinge in which a first support frame and a second support frame are hinge-connected, and may be located at driving units 21, 31, and 41 configured to provide assistant torque.

Also, when the joint motion detecting units 29, 39, and 49 measure a joint angle, an angle sensor such as a potentiometer, an absolute encoder, an incremental encoder, and the like may be used. The potentiometer is an angle sensor that changes a value of a variable resistor according to an angle and calculates an electrical input proportional to an angle of a moving joint. The absolute encoder is an angle sensor that detects a corresponding position with a certain degree of rotation using an optical pulse wave without setting a reference position. The incremental encoder is an angle sensor that calculates an angle through an increase and a decrease of a measured angle by setting a reference position and detects a corresponding position with a certain degree of rotation using an optical pulse wave.

Also, the joint motion detecting units 29, 39, and 49 may include at least one inertial measurement unit (IMU). The IMU may include a multi-axis inertial sensor, for example, at least one of a 3-axis inertial sensor and a gyro sensor. In some example embodiments, the IMU may measure a slope of the wearer's upper body or a walking acceleration and convert the result into a walking speed.

In addition, the joint motion detecting units 29, 39, and 49 may include at least one EMG measurement device. The EMG measures muscle movement by detecting an electrical change in the muscle from a muscle response in response to nerve stimulation using an EMG instrument. Accordingly, in some example embodiments, a movement pattern of the wearer's muscle may be converted into data through measurement of the EMG, and this data may be used to determine the assistant torque.

Alternatively, instead of directly using the joint motion detecting units 29, 39, and 49, in other example embodiments a walking speed and a slope of the ground may be indirectly estimated using the measured joint motion. For example, when a position of the measured joint is a hip joint, a moving distance is calculated from a length of the wearer's leg and a walking cycle with a maximum angle and a minimum angle of a hip joint trajectory. A walking speed may be calculated by multiplying the distance by a frequency of hip joint motion. Also, a current slope of the ground may be calculated by matching the measured joint angle to data on a slope of the ground that is set (e.g., preset) to be in one-to-one correspondence with the measured joint angle.

As illustrated in FIGS. 1A, 1B, and 1C, the walking assistant units 20, 30, and 40 may include a hip joint walking assistant unit 20, a knee joint walking assistant unit 30, and an ankle joint walking assistant unit 40.

The hip joint walking assistant unit 20 may assist with movement of the wearer's femoral region and hip joint during walking motion. The knee joint walking assistant unit 30 may assist with movement of the wearer's lower leg and knee joint during walking motion. Also, the ankle joint walking assistant unit 40 may assist with movement of the wearer's ankle joint and related muscles during walking motion.

According to some example embodiments, the hip joint walking assistant unit 20, the knee joint walking assistant unit 30, and the ankle joint walking assistant unit 40 may be selectively provided in the walking assistant device 1. Therefore, the hip joint walking assistant unit 20, the knee joint walking assistant unit 30, and the ankle joint walking assistant unit 40 may be fixed on at least one region of the wearer's hip, knee, and ankle.

Also, when the units are fixed on two or more regions among the hip, the knee, and the ankle, some example embodiments provide assistant torque for another region using a walking phase calculated in one region. For example, the hip joint walking assistant unit 20 calculates a walking phase by measuring motion of the hip joint, and the knee joint walking assistant unit 30 may use the walking phase calculated in the hip joint walking assistant unit 20 to determine assistant torque for a knee region.

Also, the hip joint walking assistant unit 20, the knee joint walking assistant unit 30, and the ankle joint walking assistant unit 40 may be put on one or more of a left leg and/or a right leg of the wearer.

In addition, according to other example embodiments, the hip joint walking assistant unit 20, the knee joint walking assistant unit 30, and the ankle joint walking assistant unit 40 may be provided as a pair of hip joint walking assistant units 20R and 20L, a pair of knee joint walking assistant units 30R and 30L, and a pair of ankle joint walking assistant units 40R and 40L to be installed in both of left and right legs to assist with bipedal walking. In this case, when a walking phase is calculated in either of the left leg or the right leg, it is possible to provide assistant torque for the other leg using the same walking phase in the other leg. For example, the right knee joint walking assistant unit 30R calculates a walking phase by measuring motion of a knee joint of a right knee, and the left knee joint walking assistant unit 30L may use the walking phase calculated by the right knee joint walking assistant unit 30R to determine assistant torque for a left knee region.

For convenience of description, the walking assistant device 1 including the plurality of hip joint walking assistant units 20, the knee joint walking assistant unit 30, and the ankle joint walking assistant unit 40 will hereinafter be described, however, example embodiments are not limited thereto.

Each of the plurality of hip joint walking assistant units 20R and 20L may include at least one of the waist fixing units 12a and 12b, thigh fixing units 23R and 23L, first hip support frames 14R and 14L, second hip support frames 22R and 22L, hip power units 21R and 21L, and hip joint motion detecting units 29R and 29L.

The hip power units 21R and 21L may generate assistant torque of various sizes in at least one direction while rotating in at least one direction, and apply the assistant torque to the first hip support frames 14R and 14L and the second hip support frames 22R and 22L. The hip power units 21R and 21L may be set to rotate and drive within an operating range of the hip joint of the human body.

According to some example embodiments, the hip power units 21R and 21L may also include at least one motor configured to generate rotational force of desired (or, alternatively, a predetermined) torque according to electrical energy and the like supplied from the main body unit 10 and the like. In addition, at least one piston or cylinder device configured to generate rotational force by operating according to electrical energy or a pressure of a fluid, for example, a pressure such as a hydraulic pressure, an air pressure, and the like, supplied from the main body unit 10 and the like, may also be included. In addition, in some example embodiments, the hip power units 21R and 21L may include both at least one motor and at least one piston or cylinder device.

At least one of the first hip support frames 14R and 14L and the second hip support frames 22R and 22L may be physically connected to the hip power units 21R and 21L, and may be rotated in at least one direction according to the assistant torque generated from the hip power units 21R and 21L.

As illustrated in FIGS. 1A, 1B, and 1C, the first hip support frames 14R and 14L and the second hip support frames 22R and 22L may be implemented by at least one support. The first hip support frames 14R and 14L and the second hip support frames 22R and 22L may have various shapes as necessary. For example, the first hip support frames 14R and 14L and the second hip support frames 22R and 22L may have a hexahedral shape and may be implemented by connecting a plurality of supports.

In addition, the first hip support frames 14R and 14L and the second hip support frames 22R and 22L may be implemented by connecting a plurality of nodes. In this case, a plurality of joints connecting the plurality of nodes may be combined among the plurality of nodes. The plurality of joints are rotatable in at least one direction. Accordingly, the first hip support frames 14R and 14L and the second hip support frames 22R and 22L may be bent within a certain range in at least one direction according to rotation ranges of the plurality of joints. In some example embodiments, a single joint or a plurality of joints can connect two nodes out of the plurality of nodes. When the plurality of joints connect two nodes, each joint may be rotatable in a different direction. Accordingly, the first hip support frames 14R and 14L and the second hip support frames 22R and 22L may be bent within a certain range in various directions.

In some example embodiments, the first hip support frames 14R and 14L and the second hip support frames 22R and 22L may be made of a material having flexibility and bent within a certain range due to flexibility of the material.

The plurality of hip joint walking assistant units 20R and 20L may include the waist fixing units 12a and 12b and the thigh fixing units 23R and 23L, which are configured to fix the first hip support frames 14R and 14L and the second hip support frames 22R and 22L on the wearer's hip joint and femoral region. The first hip support frames 14R and 14L and the second hip support frames 22R and 22L may be fixed on the hip joint, and an inner thigh or outer thigh of the wearer through the waist fixing units 12a and 12b and the thigh fixing units 23R and 23L. When the first hip support frames 14R and 14L and the second hip support frames 22R and 22L rotate according to assistant torque provided from the hip power units 21R and 21L, the hip joint and the femoral region fixed on the first hip support frames 14R and 14L and the second hip support frames 22R and 22L may rotate around the hip joint in the same direction.

The waist fixing units 12a and 12b and the thigh fixing units 23R and 23L may be made of a metal material, or various materials having elasticity such as rubber. Also, the waist fixing units 12a and 12b and the thigh fixing units 23R and 23L may be a band having elasticity or various straps. Alternatively, various fixing units configured to fix the first hip support frames 14R and 14L and the second hip support frames 22R and 22L on the femoral region and the like may be used as examples of the waist fixing units 12a and 12b and the thigh fixing units 23R and 23L.

By fixing the waist fixing units 12a and 12b and the thigh fixing units 23R and 23L on the hip joint, the femoral region, and the like, the hip joint walking assistant units 20R and 20L may apply a desired (or, alternatively, a predetermined) assistant torque to the wearer's femoral region, hip joint, and the like to assist with raising or lowering movement of the wearer's femoral region. Accordingly, when the wearer performs operations of raising his or her leg or walking, it is possible to more conveniently perform the operation.

Each of the plurality of knee joint walking assistant units 30R and 30L may include at least one of thigh fixing units 23R and 23L, shin fixing units 33R and 33L, first knee support frames 22R and 22L, second knee support frames 32R and 32L, knee power units 31R and 31L, and knee joint trajectory detecting units 39R and 39L.

The knee power units 31R and 31L may generate assistant torque of various sizes in at least one direction. The knee power units 31R and 31L may be set to drive within an operating range of the knee joint of the human body.

According to some example embodiments, the knee power units 31R and 31L may also include at least one motor or at least one piston or cylinder device which is configured to generate rotational force of a desired (or, alternatively, a predetermined) torque according to electric power or a pressure of a fluid directly provided from the main body unit 10, and the like, or electric power or a pressure of a fluid indirectly delivered through the hip joint walking assistant units 20R and 20L. As described above, the knee power units 31R and 31L may also include both at least one motor and at least one piston or cylinder device.

At least one of the first knee support frames 22R and 22L and the second knee support frames 32R and 32L may be physically connected to the knee power units 31R and 31L, and may rotate in at least one direction according to the assistant torque generated from the knee power units 31R and 31L. Configurations, structures, materials, and the like of the first knee support frames 22R and 22L and the second knee support frames 32R and 32L may be the same as or different from those of the first hip support frames 14R and 14L and the second hip support frames 22R and 22L.

The plurality of knee joint walking assistant units 30R and 30L may include the thigh fixing units 23R and 23L and the shin fixing units 33R and 33L which are configured to fix the first knee support frames 22R and 22L and the second knee support frames 32R and 32L on the wearer's femoral region and lower leg. The first knee support frames 22R and 22L and the second knee support frames 32R and 32L may be fixed on an inner or outer thigh and an inner or outer lower leg of the wearer through the thigh fixing units 23R and 23L and the shin fixing units 33R and 33L. Configurations, structures, materials, and the like of the shin fixing units 33R and 33L may be the same as or different from those of the waist fixing units 12a and 12b and the thigh fixing units 23R and 23L.

When the femoral region and the lower leg are fixable on the thigh fixing units 23R and 23L, the shin fixing units 33R and 33L, and the like by the first knee support frames 22R and 22L and the second knee support frames 32R and 32L, the knee joint walking assistant units 30R and 30L may apply a desired (or, alternatively, a predetermined) assistant torque to the wearer's lower leg, knee joint, and the like. Accordingly, the knee joint walking assistant units 30R and 30L may assist with raising or lowering movement of the wearer's lower leg.

Each of the plurality of ankle joint walking assistant units 40R and 40L may include at least one of ankle fixing units 34R and 34L, foot top side fixing units 43R and 43L, first ankle support frames 32R and 32L, second ankle support frames 42R and 42L, ankle power units 41R and 41L, and ankle joint motion detecting units 49R and 49L. Therefore, the ankle joint walking assistant units 40R and 40L may assist with movement of the wearer's ankle during walking motion.

The ankle fixing units 34R and 34L and the foot top side fixing units 43R and 43L may be connected to the first ankle support frames 32R and 32L, the second ankle support frames 42R and 42L, and the like, and may provide a function of fixing the first ankle support frames 32R and 32L and the second ankle support frames 42R and 42L, and the like on the wearer's ankle. Configurations, structures, and materials of the ankle fixing units 34R and 34L and the foot top side fixing units 43R and 43L may be the same as or different from those of the waist fixing units 12a and 12b and the thigh fixing units 23R and 23L.

The second ankle support frames 42R and 42L may be fixed on the bottom of the wearer's foot.

A pressure sensor may be provided in the second ankle support frames 42R and 42L. The pressure sensor may detect whether the wearer puts on the walking assistant device 1 or stands up by detecting the wearer's weight, and the like.

In addition, the pressure sensor may be configured to detect ground reaction force (GRF) exerted on the wearer's foot when the wearer walks, that is, a GRF sensor, may also be installed in the second ankle support frames 42R and 42L.

According to some example embodiments, the ankle power units 41R and 41L may also include at least one motor or at least one piston or cylinder device which is configured to generate rotational force of predetermined torque according to electric power or a pressure of a fluid directly provided from the main body unit 10 and the like, or electric power or a pressure of a fluid indirectly delivered through the hip joint walking assistant units 20R and 20L and the like. As described above, the ankle power units 41R and 41L may also include both at least one motor and at least one piston or cylinder device.

In some example embodiments, the number of fixing units 12a, 12b, 23R, 23L, 33R, 33L, 34R, 34L, 43R, and 43L of the walking assistant device 1 may be greater or less than that of the above description according to design intention of a designer of the walking assistant device 1.

According to some example embodiments, driving and operations of the walking assistant units 20, 30, and 40 described above may be started or controlled by the actuator installed in the main body unit 10 and the like. Also, each of the walking assistant units 20, 30, and 40 may receive a control signal independently and may be started and operated independently.

According to the various components described above and operations thereof, the walking assistant device 1 may assist a user with walking.

Hereinafter, each configuration of the walking assistant device 1 for controlling the walking assistant units 20, 30, and 40 of the walking assistant device 1 will be described with reference to FIGS. 2 to 12.

Figure 2:
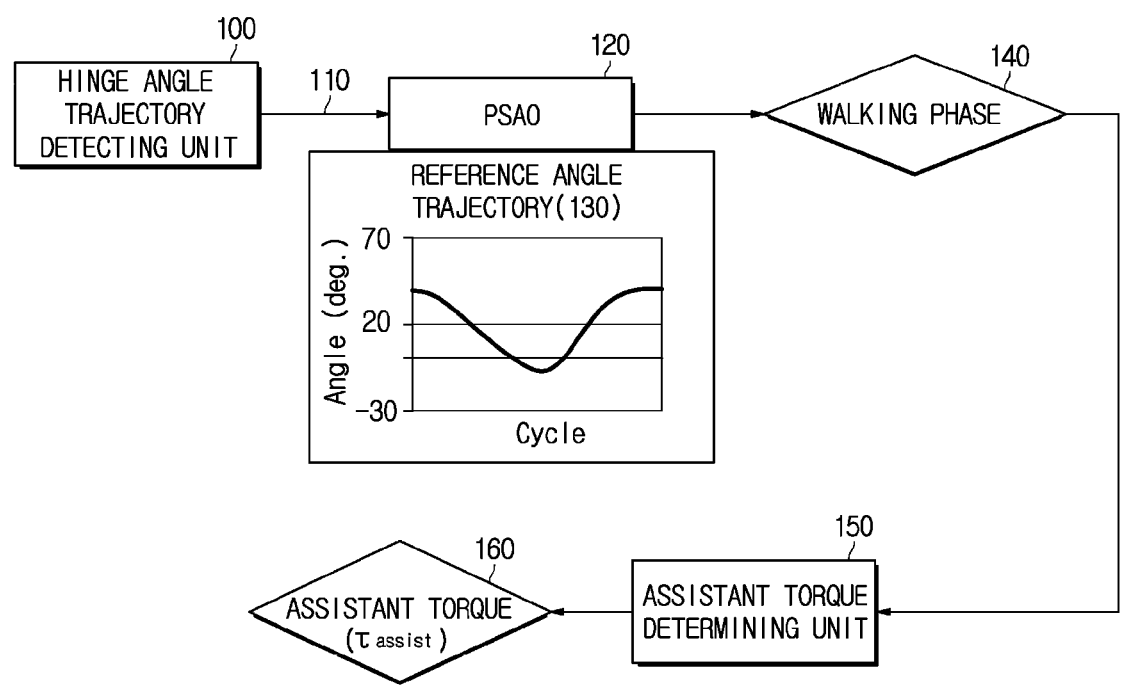
FIG. 2 is a conceptual diagram of an embodiment in which a corrected angle trajectory overlapped from a reference angle trajectory and a phase of the corrected angle trajectory are calculated using a particularly shaped adaptive oscillator (PSAO), and assistant torque corresponding to the phase of the corrected angle trajectory is determined.

FIG. 2 illustrates a method of determining an assistant torque corresponding to a walking phase according to some example embodiments.

As illustrated in FIG. 2, the controller may measure a hinge angle 110 corresponding to the wearer's joint angle through a hinge angle trajectory detecting unit 100. The controller may determine a walking phase 140 based on the measured hinge angle 110 and a reference angle trajectory 130 using a PSAO 120. The PSAO 120 may be a signal processing module that uses the measured hinge angle 110 as an input and outputs the walking phase 140. The controller may determine an assistant torque 160 that corresponds to the determined walking phase 140 using an assistant torque determining unit 150. The reference angle trajectory 130 stored in the PSAO 120 may be a trajectory of an angle with respect to the walking phase 140. Here, the walking phase 140 may be defined as a linearly increasing variable during one cycle. The one cycle is set as a period the moment a foot touches the ground until the moment the foot touches the ground again. For example, in the walking phase 140, the moment the foot touches the ground may be set to 0 [%], and a moment immediately before the foot touches the ground again may be set to 100 [%] as the phase linearly increases during one walking cycle.

The PSAO 120 may include a plurality of oscillators having an offset, and a fundamental frequency or a frequency that has been modulated from the fundamental frequency. The plurality of oscillators may include respective phases and amplitudes. Here, the frequency that has been modulated from the fundamental frequency may be a frequency that is an integer multiple of the fundamental frequency.

Specifically, the PSAO 120 may obtain respective angles by applying the reference angle trajectory 130 and respective phases and amplitudes to each of the plurality of oscillators having the fundamental frequency and the frequency that is an integer multiple of the fundamental frequency.

Then, an overlapping angle is generated by overlapping a plurality of angles obtained from the plurality of oscillators. An overlapping angle trajectory may be generated by combining the generated overlapping angles in order of the walking cycle.

Then, the PSAO 120 may repeatedly correct the fundamental frequency, the offset, and phases and amplitudes of the plurality of oscillators in order to minimize errors between the overlapping angle and the measured hinge angle 110. When this correction is repeated a desired (or, alternatively, a predetermined) number of times, the overlapping angle trajectory may form a periodic trajectory approximating the hinge angle trajectory in which the hinge angles 110 are combined in order of the walking cycle. The fundamental frequency, the offset, and the amplitudes of the plurality of oscillators may converge at certain values to correspond to the measured hinge angle trajectory.

When the PSAO 120 performs correction to correspond to the measured hinge angle 110 and forms the overlapping angle trajectory, and the value converges at a certain value, the controller may determine that the fundamental frequency of the PSAO corresponds to a walking frequency and a phase of an oscillator having a fundamental frequency corresponds to the current walking phase 140 of the wearer.

Hereinafter, a method in which the PSAO 120 periodically corrects the fundamental frequency, the offset, and the phases and amplitudes of the plurality of oscillators to correspond to the measured hinge angle trajectory, and a method of calculating the walking phase 140 from the corrected fundamental frequency will be described with equations.

As discussed in more detail below, the controller of the walking assistant device 1 may be programmed with computer readable code that configures the processor to utilize one or more of Equations 1-16 discussed below to perform the operations illustrated in FIG. 13. For example, the processor may utilize one or more of Equations 1-16 to calculate an overlapping angle trajectory corresponding to a measured hinge angle and providing assistant torque based on correcting the overlapping angle trajectory.

$$\theta_p(n) = \alpha_0 + \sum_{i=1} \alpha_i(n) f(\varphi_i(n)) \qquad \text{[Equation 1]}$$

Equation 1 is an equation for calculating an overlapping angle such that a value obtained by assigning each phase of a specific oscillator to a reference angle trajectory function $f(\varphi)$ is multiplied by each amplitude of the specific oscillator, this multiplication is performed for the plurality of oscillators, results thereof are summed, and an offset of the PSAO is added thereto.

Among variables in Equation 1, i is an index of the plurality of oscillators of the PSAO, n is an index of a cycle of hinge angle measurement and correction, $\theta_p$ is an overlapping angle, $\alpha_0$ is an offset of the overlapping angle, $\alpha_i$ is an amplitude of an i-th oscillator, $f(\varphi)$ is a function of a phase of a reference angle trajectory of the oscillator of the PSAO, and $\varphi_i$ is a phase of the i-th oscillator.

$$\varepsilon(n) = \theta_h(n) - \theta_p(n) \qquad \text{[Equation 2]}$$

Equation 2 is an equation for calculating an error value. The error value may be a difference value between the measured hinge angle 110 and the overlapping angle calculated in Equation 1.

Among variables in Equation 2, ε is an error value between the measured hinge angle and the overlapping angle of the PSAO, and $\theta_h$ is the measured hinge angle.

$$f'(\varphi) = \frac{\partial f}{\partial \phi}(\varphi) \qquad \text{[Equation 3]}$$

Equation 3 represents a change rate of the reference angle trajectory of the oscillator of the PSAO, and may be calculated by differentiating the function of the reference angle trajectory with respect to phase.

Among variables in Equation 3, $f'(\varphi)$ is a change rate of the reference angle trajectory function $f(\varphi)$ of the oscillator of the PSAO with respect to phase $$\alpha_i(n+1) = \max\left\{0, \alpha_i(n) + T_s \frac{k_\alpha}{i} \varepsilon f(\varphi_i(n))\right\} \qquad \text{[Equation 4]}$$

Equation 4 is an equation for correcting an amplitude of an oscillator having a frequency i times the fundamental frequency out of the plurality of oscillators of the PSAO. A correction gain of the amplitude, the error value, and a result value obtained by assigning the phase of the i-th oscillator to the reference angle trajectory function are multiplied. The multiplication result is divided by the oscillator index to calculate an amplitude correction amount of the oscillator. Also, a current correction amplitude value may be determined by adding a previously corrected amplitude value and a value that is obtained by multiplying the amplitude correction amount by a correction repetition cycle $T_s$. However, the current correction amplitude value may be limited not to be less than zero. It is possible to reduce the error value between the hinge angle 110 and the overlapping angle through calculation of Equation 4.

Among variables in Equation 4, $k_\alpha$ is a correction gain of the amplitude, and $T_s$ is a cycle of hinge angle measurement and correction repetition. Also, when a measuring time is a sampling time, an interval between sampling times may be a sampling cycle ($T_s$). The sampling cycle may be a unit time of calculation, and may generally have a value in a range of about $T_s=1$ to 10 [ms].

$$\varphi_i(n+1) = \varphi_i(n) + T_s\left(i\omega(n) + k_\varphi \frac{\varepsilon}{\sum \alpha_i(n)} f'(\varphi_i(n))\right) \quad \text{[Equation 5]}$$

Equation 5 is an equation for calculating a phase of an oscillator having a frequency i times the fundamental frequency out of the plurality of oscillators of the PSAO. The i-th oscillator may have the frequency i times the fundamental frequency. In the phase, since an increment of the phase may decrease or increase according to a value obtained by multiplying the error value by the change rate of the reference angle trajectory, the error value between the hinge angle 110 and the overlapping angle trajectory of the PSAO may decrease. Accordingly, in order to correct the phase, a first result value is obtained by multiplying the index of the oscillator by the fundamental frequency of the PSAO. A correction gain of the phase, the error value, and a result value obtained by assigning a phase of a corresponding oscillator to the function of the change rate of the current reference angle trajectory are multiplied. The multiplication result is divided by a sum of amplitudes of the plurality of oscillators to obtain a second result value. Also, when the first result value and the second result value are added, it is possible to calculate a correction value of the phase of the i-th oscillator. When this correction value is multiplied by a correction cycle period, and the phase corrected in a previous sampling time is added thereto, it is possible to calculate a currently corrected phase of the i-th oscillator.

Among variables in Equation 5, $k_\varphi$ is a correction gain of the phase and w is the fundamental frequency of the PSAO.

$$\omega(n+1) = \omega(n) + T_s\left(k_\omega \frac{\varepsilon}{\sum \alpha_i} f'(\varphi_1) + \sum k_c e^{-\frac{(\omega_{ext}-\omega)^2}{2}} (\omega_{ext} - \omega)\right) \quad \text{[Equation 6]}$$

Equation 6 is an equation for correcting the fundamental frequency of the PSAO. A correction gain of the frequency, the error value, and a result value obtained by assigning the phase of the i-th oscillator to the function of the change rate of the current reference angle trajectory are multiplied. The multiplication result is divided by a sum of amplitudes of the plurality of oscillators to obtain a third result value. Also, a coupling frequency gain, a natural log of a value that is obtained by multiplying a square of a difference between a frequency of a hinge angle trajectory measured by another PSAO in another side and the fundamental frequency of the present PSAO by −½, and a difference between the frequency of the hinge angle trajectory measured in another side and the frequency of the hinge are multiplied. The results of multiplying are summed for all hinges except the hinge calculated in Equation 6 to obtain a fourth result value.

The third result value in Equation 6 may be an equation for correcting the fundamental frequency such that the fundamental frequency of the PSAO corresponds to the frequency of the hinge angle trajectory.

Also, although frequencies of the hinge angle trajectories measured in left and right detecting units or in detecting units of different regions typically match a common walking frequency, the fourth result value may be an equation for correcting the fundamental frequency in order to match frequencies in a special case in which frequencies estimated by respective PSAOs are different.

Specifically, a natural log part of the fourth result value converges at 0 when a difference between two frequencies is large, thereby blocking attraction between the two frequencies, and may be corrected to be matched when the difference between the two frequencies is small.

As a result, a sum of the third result value and the fourth result value may be a correction amount of the fundamental frequency of the PSAO. When a correction cycle is multiplied by the sum of the third result value and the fourth result value and the previously corrected fundamental frequency is added thereto, it is possible to obtain a currently corrected fundamental frequency.

Among variables in Equation 6, $k_\omega$ is the correction gain of the frequency, $k_c$ is the coupling frequency gain, and $\omega_{ext}$ is the frequency of the hinge angle trajectory that is measured in another side and calculated by another PSAO.

$$\alpha_o(n+1) = \alpha_o(n) + T_s k_o \varepsilon \quad \text{[Equation 7]}$$

Equation 7 is an equation for correcting the offset of the overlapping angle of the PSAO. The offset of the overlapping angle of the PSAO is corrected to correspond to an offset of the hinge angle. Therefore, it is possible to reduce errors due to the offset.

Among variables in Equation 7, $k_o$ is an offset correction gain. The PSAO calculates the overlapping angle to correspond to the hinge angle through the above equations and concepts. While this process continues while the wearer is walking, it is possible to approximate the overlapping angle and the trajectory of the hinge angle 110.

In addition, in some example embodiments, the plurality of PSAOs described above may be provided in the control unit.

Figure 3:
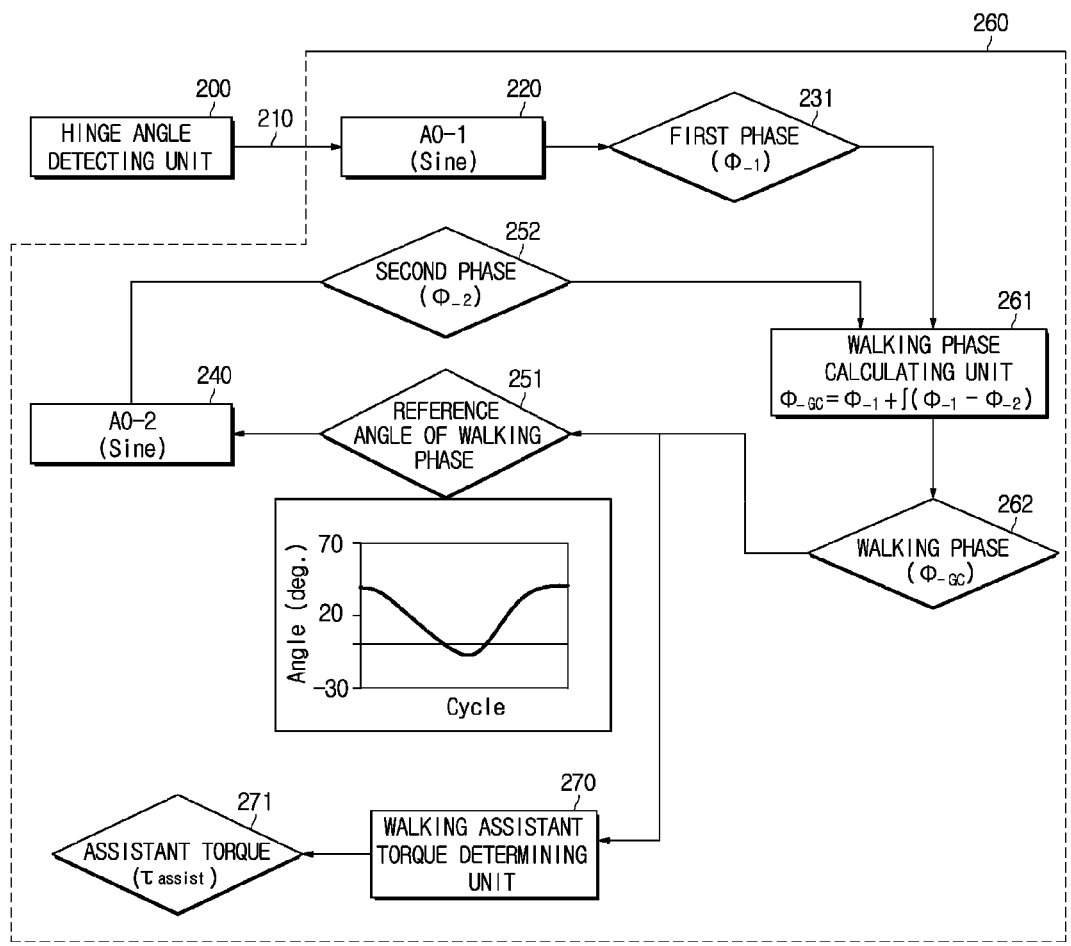
FIG. 3 is a conceptual diagram of an embodiment in which a first overlapping angle trajectory with respect to a hinge angle and a second overlapping angle trajectory from a reference angle are calculated and corrected using a phase compensated adaptive oscillator (PCAO), a walking phase is calculated by comparing them, and assistant torque corresponding to the walking phase is determined.

FIG. 3 illustrates a concept of an embodiment in which a walking phase 262 is calculated from a measured hinge angle 210 and the reference angle trajectory using a PCAO 260, and an assistant torque 271 corresponding to the walking phase 262 is determined.

The hinge angle 210 corresponding to the wearer's joint angle is measured through a hinge angle detecting unit 200. The walking phase 262 is obtained from the PCAO using the measured hinge angle 210 as an input, and an assistant torque determining unit 270 may determine the assistant torque 271 corresponding to the walking phase 262.

The PCAO 260 may be a signal processing module that uses the measured hinge angle 210 as an input and outputs a current walking phase 262 or may be a sub-concept of the PSAO that replaces the reference angle trajectory of the PSAO with a sinusoidal wave.

Specifically, the PCAO 260 may include a first adaptive oscillator (AO-1) 220, a second adaptive oscillator (AO-2) 240, and a walking phase calculating unit 261.

The first adaptive oscillator (AO-1) 220 may be a module that uses the currently measured hinge angle 210 as an input, calculates a first overlapping angle trajectory by overlapping trigonometric functions having the fundamental frequency and a frequency that has been modulated from the fundamental frequency, and calculates a first phase 231 that is a phase of the trigonometric function having the fundamental frequency.

The second adaptive oscillator (AO-2) 240 may be a module that uses the current walking phase 262 calculated by the walking phase calculating unit as an input, applies a reference angle 251 at the reference angle trajectory corresponding to the walking phase 262 to trigonometric functions having the fundamental frequency and a frequency that has been modulated from the fundamental frequency, calculates a second overlapping angle trajectory by overlapping the trigonometric functions to which the reference angle 251 is applied, and calculates a second phase 252 that is a phase of the trigonometric function having the fundamental frequency.

Since the first adaptive oscillator (AO-1) 220 of the PCAO 260 is a module that calculates only a phase corresponding to the currently measured hinge angle 210, it is unable to compensate the first overlapping angle trajectory by the second overlapping angle trajectory using the reference angle trajectory of the hinge during walking. Therefore, the PCAO 260 may further include the second adaptive oscillator (AO-2) 240.

The walking phase calculating unit 261 may be a module that uses the first phase 231 calculated by the first adaptive oscillator (AO-1) 220 and the second phase 252 calculated by the second adaptive oscillator (AO-2) 240 as an input, reflects a phase difference between the first phase 231 and the second phase 252, and calculates the current walking phase 262.

Hereinafter, signal processing of calculating the current walking phase 262 using the measured hinge angle 210 in the PCAO 260 as an input will be described from a viewpoint of the PCAO 260 rather than individual components of the PCAO 260.

In the first adaptive oscillator (AO-1) 220, the first phase 231 output from the first adaptive oscillator (AO-1) 220 using the measured hinge angle 210 as an input may be a phase of the first overlapping angle trajectory that is obtained by applying the hinge angle 210 to the trigonometric function having the fundamental frequency of the first adaptive oscillator (AO-1) 220 and a frequency that has been modulated from the fundamental frequency. Also, the first phase may be a phase of the trigonometric function having the fundamental frequency out of trigonometric functions forming the phase of the first overlapping angle trajectory.

Meanwhile, the walking phase 262 may be a phase that is determined using a moment at which a heel comes in contact with the ground as a reference time. However, since the first phase 231 does not assume a moment at which a heel comes in contact with the ground as a reference time, it is unable to represent the first phase 231 as the walking phase. In order to compensate for a difference of reference times, the walking phase calculating unit 261 may determine the walking phase 262 by correcting the first phase 231.

The controller of the walking assist device 1 may perform a correcting method such that the second overlapping angle trajectory is calculated using the second adaptive oscillator (AO-2) 240 and the second phase 252 that is a phase of the second overlapping angle trajectory is compared with the first phase 231 and corrected.

Specifically, the second phase 252 calculated using the reference angle 251 at the reference angle trajectory corresponding to the walking phase 262 in the second adaptive oscillator (AO-2) 240 as an input may be a phase of the second overlapping angle trajectory that is obtained by overlapping trigonometric functions having the fundamental frequency of the second adaptive oscillator (AO-2) 240 and a frequency that has been modulated from the fundamental frequency. Also, the second phase may be a phase of the trigonometric function having the fundamental frequency out of the trigonometric functions forming the phase of the second overlapping angle trajectory.

Also, the PCAO 260 compensates the first phase 231 by accumulating a difference between the second phase 252 and the first phase 231 in the walking phase calculating unit 261, and calculates the walking phase 262.

Then, the assistant torque determining unit 270 may determine assistant torque 271 corresponding to the walking phase 262 calculated through the PCAO 260.

The controller of the walking assist device 1 may be configured with computer readable code to perform the functions of the first adaptive oscillator (AO-1) 220 and the second adaptive oscillator (AO-2) 240 described above. Operations thereof will be described by the following equations.

$$\theta_p(n) = \alpha_0 + \sum_{i=1} \alpha_i(n)\sin(\varphi_i(n)) \qquad \text{[Equation 8]}$$

Equation 8 is an equation for calculating an overlapping angle by the adaptive oscillator (AO) such as the first adaptive oscillator (AO-1) and the second adaptive oscillator (AO-2). The overlapping angle may be calculated such that a value obtained by assigning phases of several oscillators forming a single AO to a sine function is multiplied by an amplitude of a corresponding oscillator, this multiplication is performed for all oscillators, results thereof are summed and an offset is added thereto.

Among variables in Equation 8, i is an index of the plurality of oscillators of the PCAO, n is an index of a cycle of hinge angle measurement and correction, $\theta_p$ is an overlapping angle, $\alpha_0$ is an offset of the overlapping angle, $\alpha_i$ is an amplitude of an i-th oscillator, and $\varphi_i$ is a phase of the i-th oscillator.

$$\varepsilon(n) = \theta_h(n) - \theta_p(n) \qquad \text{[Equation 9]}$$

Equation 9 is an equation for calculating an error value in a single AO module. The error value may be a difference value between an input value of the AO and the overlapping angle calculated in Equation 8. An input value of the AO-1 may be a current hinge angle and an input value of the AO-2 may be a reference angle corresponding to the current walking phase.

Among variables in Equation 9, $\varepsilon$ is the error value, and $\theta_h$ is the input value of the AO.

$$\alpha_i(n+1) = \max\left\{0,\ \alpha_i(n) + T_s \frac{k_\alpha}{i}\varepsilon\sin(\varphi_i(n))\right\} \qquad \text{[Equation 10]}$$

Equation 10 is an equation for correcting an amplitude of an oscillator having a frequency i times the fundamental frequency out of the plurality of oscillators of the PCAO. A correction gain of the amplitude, the error value, and a result value obtained by assigning the phase of the i-th oscillator to a sine function are multiplied. The multiplication result is divided by the oscillator index to calculate an amplitude correction amount of the oscillator. Also, a current correction amplitude value may be determined by adding a previously corrected amplitude value and a value that is obtained by multiplying the amplitude correction amount by a correction repetition cycle $T_s$. However, the current correction amplitude value may be limited not to be less than zero. It is possible to reduce the error value between the hinge angle and the overlapping angle through calculation of Equation 10.

Among variables in Equation 10, $k_\alpha$ is a correction gain of the amplitude, and $T_s$ is a cycle of hinge angle measurement and correction repetition. Also, a sampling time $T_s$ that is a unit time of measurement and calculation may generally have a value in a range of about $T_s=1$ to 10 [ms].

$$\varphi_i(n+1) = \varphi_i(n) + T_s\left(i\omega(n) + k_\varphi \frac{\varepsilon}{\sum \alpha_i(n)} \cos(\varphi_i(n))\right) \quad \text{[Equation 11]}$$

Equation 11 is an equation for calculating a phase of an oscillator having a frequency i times the fundamental frequency out of the plurality of oscillators of the PCAO. The i-th oscillator may have the frequency i times the fundamental frequency. In the phase, since an increment of the phase may decrease or increase according to a value that is obtained by multiplying the error value by a cosine function value, the error value between the input value of the AO and the overlapping angle of the AO may decrease. Accordingly, in order to correct the phase, a fifth result value is obtained by multiplying the index of the oscillator by the fundamental frequency of the AO. A correction gain of the phase, the error value, and a result value obtained by assigning a phase of a corresponding oscillator to the cosine function are multiplied. The multiplication result is divided by a sum of amplitudes of the plurality of oscillators to obtain a sixth result value. Also, when the fifth result value and the sixth result value are added, it is possible to calculate a correction value of the phase of the i-th oscillator. When this correction value is multiplied by a correction cycle period and a previously corrected phase is added thereto, it is possible to calculate a currently corrected phase of the i-th oscillator.

Among variables in Equation 11, $k_\varphi$ is a correction gain of the phase and w is the fundamental frequency of the AO.

$$\omega(n+1) = \quad \text{[Equation 12]}$$
$$\omega(n) + T_s\left(k_\omega \frac{\varepsilon}{\sum \alpha_i} \cos(\varphi_1) + \sum k_c e^{-\frac{(\omega_{ext}-\omega)^2}{2}} (\omega_{ext}-\omega)\right)$$

Equation 12 is an equation for correcting the fundamental frequency of the PCAO. A correction gain of the frequency, the error value, and a result value obtained by assigning a phase of the i-th oscillator to the function of the change rate of the reference angle trajectory are multiplied to obtain a seventh result value. Also, a coupling frequency gain, a natural log of a value that is obtained by multiplying a square of a difference between a frequency of a hinge angle trajectory measured by another PCAO in another side and the fundamental frequency of the AO in the present PCAO by $-\frac{1}{2}$, and a difference between the frequency of the hinge angle trajectory measured in another side and the frequency of the hinge are multiplied. The multiplication results are summed for all hinges except the hinge calculated in Equation 12 to obtain an eighth result value.

The seventh result value in Equation 12 may be an equation for correcting the fundamental frequency such that the fundamental frequency of the AO corresponds to the frequency of the hinge angle trajectory.

Also, although frequencies of the hinge angle trajectories measured in left and right detecting units or in detecting units of different regions typically match a common walking frequency, the eighth result value may be an equation for correcting the fundamental frequency in order to match frequencies in a special case in which frequencies estimated by respective PSAOs are different.

Specifically, a natural log part of the eighth result value converges at 0 when a difference between two frequencies is large, thereby blocking attraction between the two frequencies, and may be corrected to be matched when the difference between the two frequencies is small.

As a result, a sum of the seventh result value and the eighth result value may be a correction amount of the fundamental frequency of the AO. When a correction cycle is multiplied by the sum of the seventh result value and the eighth result value and the previously corrected fundamental frequency is added thereto, it is possible to obtain a currently corrected fundamental frequency.

Among variables in Equation 12, $k_\omega$ is a correction gain of the frequency, $k_c$ is a coupling frequency gain, and $\omega_{ext}$ is the frequency of the hinge angle trajectory that is measured in another side and calculated by another PCAO.

$$\alpha_o(n+1) = \alpha_o(n) + T_s k_o \varepsilon \quad \text{[Equation 13]}$$

Equation 13 is an equation for correcting an offset of the overlapping angle of the PCAO. The offset of the overlapping angle of the PCAO is corrected to correspond to an offset of the hinge angle. Therefore, it is possible to reduce errors due to the offset.

Among variables in Equation 13, $k_o$ is an offset correction gain.

$$\varphi_{GC} = \varphi_1 + f(\varphi_1 - \varphi_2) \quad \text{[Equation 14]}$$

Equation 14 is an equation for calculating a current walking phase through the first phase and the second phase. In the above PCAO method, the walking phase may be calculated by adding, to the first phase, the value that is obtained by accumulating differences between the first phase and the second phase for each cycle. When such a phase difference compensation cycle is repeated, the difference between the first phase and the second phase may converge at a certain value.

In Equation 14, $\varphi_{GC}$ is a current walking phase, $\varphi_1$ is the first phase that is an output value of the AO-1, and $\varphi_2$ is the second phase that is an output value of the AO-2.

The PCAO may calculate the walking phase corresponding to the hinge angle trajectory and the reference angle trajectory through the above equations and concepts. Also, in some example embodiments, the plurality of PCAOs described above may be provided in the control unit.

Figure 4A:
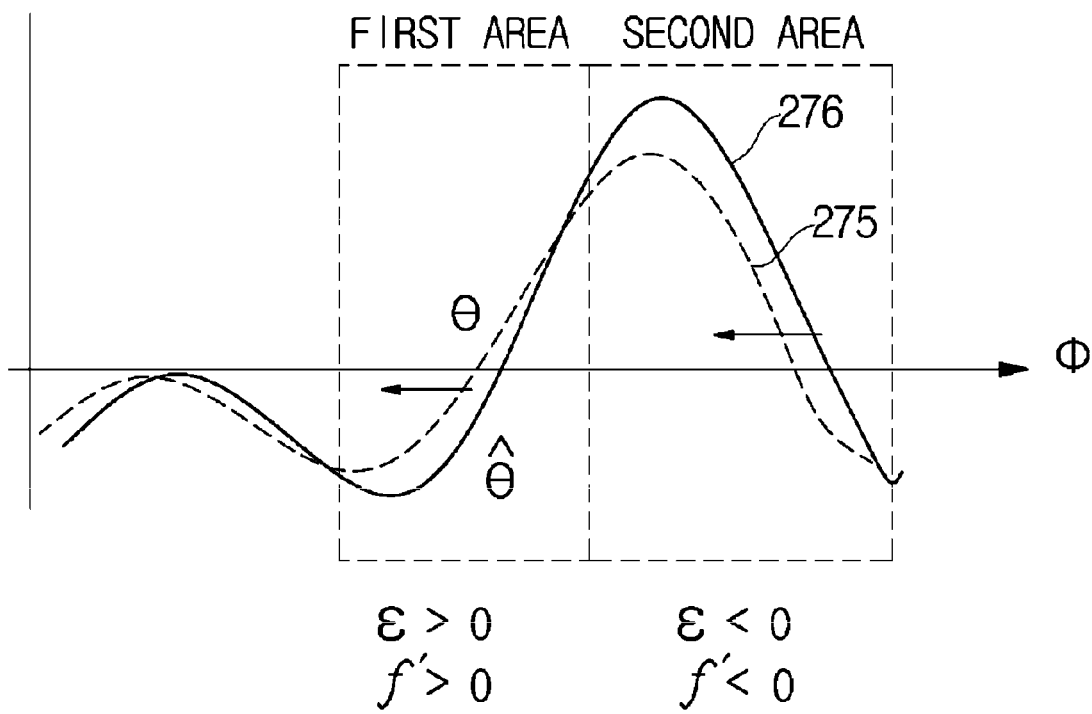
FIG. 4A is a conceptual diagram of an embodiment in which a phase of an overlapping angle trajectory is corrected using the PSAO.
Figure 4B:
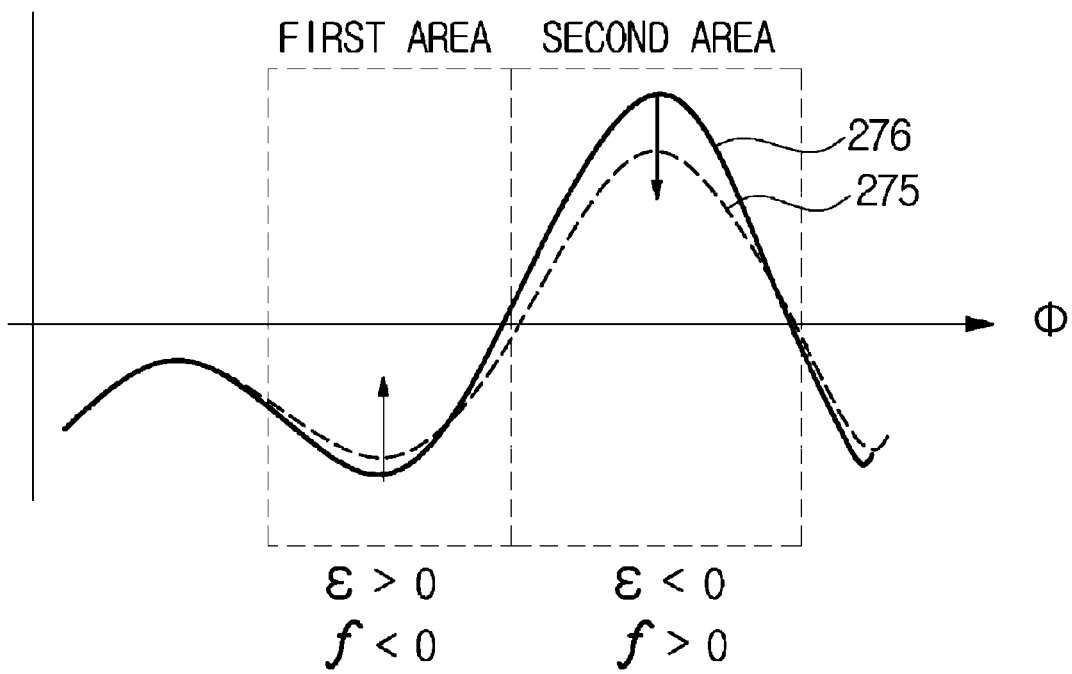
FIG. 4B is a conceptual diagram of an embodiment in which an amplitude of an overlapping angle trajectory is corrected using the PSAO.

As illustrated in FIGS. 4A and 4B, an overlapping angle trajectory 276 is corrected to correspond to a measured hinge angle trajectory 275 using the PSAO.

FIG. 4A is a conceptual diagram in which a phase of the overlapping angle trajectory 276 is corrected using the PSAO according to some example embodiments.

Referring to FIG. 4A, a phase of the overlapping angle trajectory 276 may be corrected to correspond to a phase of the measured hinge angle trajectory 275 in a first area in which the error value and the change rate of the overlapping angle trajectory function are positive and in a second area in which the error value and the change rate of the overlapping angle trajectory function are negative.

FIG. 4B is a conceptual diagram in which an amplitude of a reference angle trajectory is corrected using the PSAO according to some example embodiments.

Figure 5A:
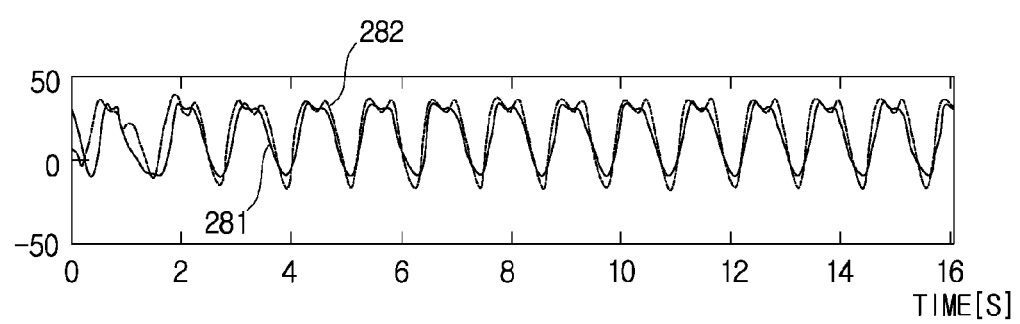
FIG. 5A is a graph of an embodiment in which a phase of an overlapping angle trajectory that has been corrected using the PSAO converges over a walking time.
Figure 5B:
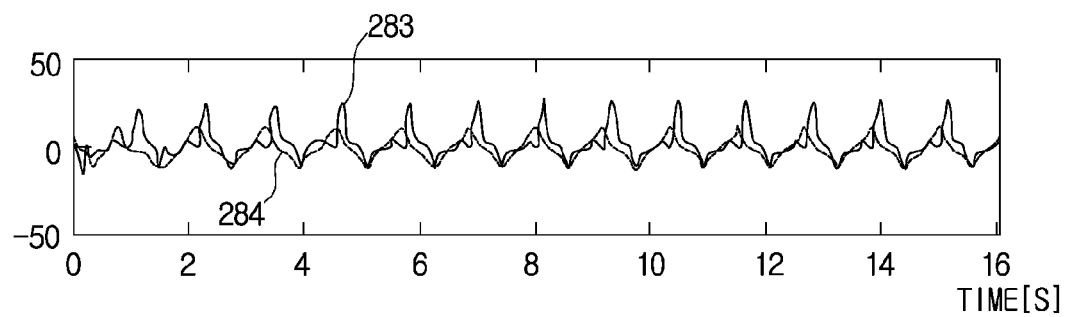
FIG. 5B is a graph of an embodiment in which torque necessary for walking and provided walking assistant torque are compared over a walking time.

Referring to FIG. 4B, an amplitude of the overlapping angle trajectory 276 may be corrected to correspond to an amplitude of the measured hinge angle trajectory 275, in a first area in which the error value and the change rate of the reference angle trajectory function are positive and in a second area in which the error value and the change rate of the reference angle trajectory function are negative. FIG. 5A is a graph in which a phase of the overlapping angle trajectory 282 that has been corrected using the PSAO converges over a walking time. FIG. 5B is a graph in which the torque 283 necessary for walking and the provided walking assistant torque 284 are compared over a walking time according to some example embodiments.

As illustrated in FIGS. 5A and 5B, as the walking time increases, an overlapping angle trajectory 282 may be corrected to correspond to a measured hinge angle trajectory 281, and provided walking assistant torque 284 converges to correspond to torque 283 necessary for walking.

As the number of correction cycles increases over the walking time, an error of phases that are starting point positions between the overlapping angle trajectory 282 corrected through the PSAO and the provided walking assistant torque 284 may decrease.

Figure 6:
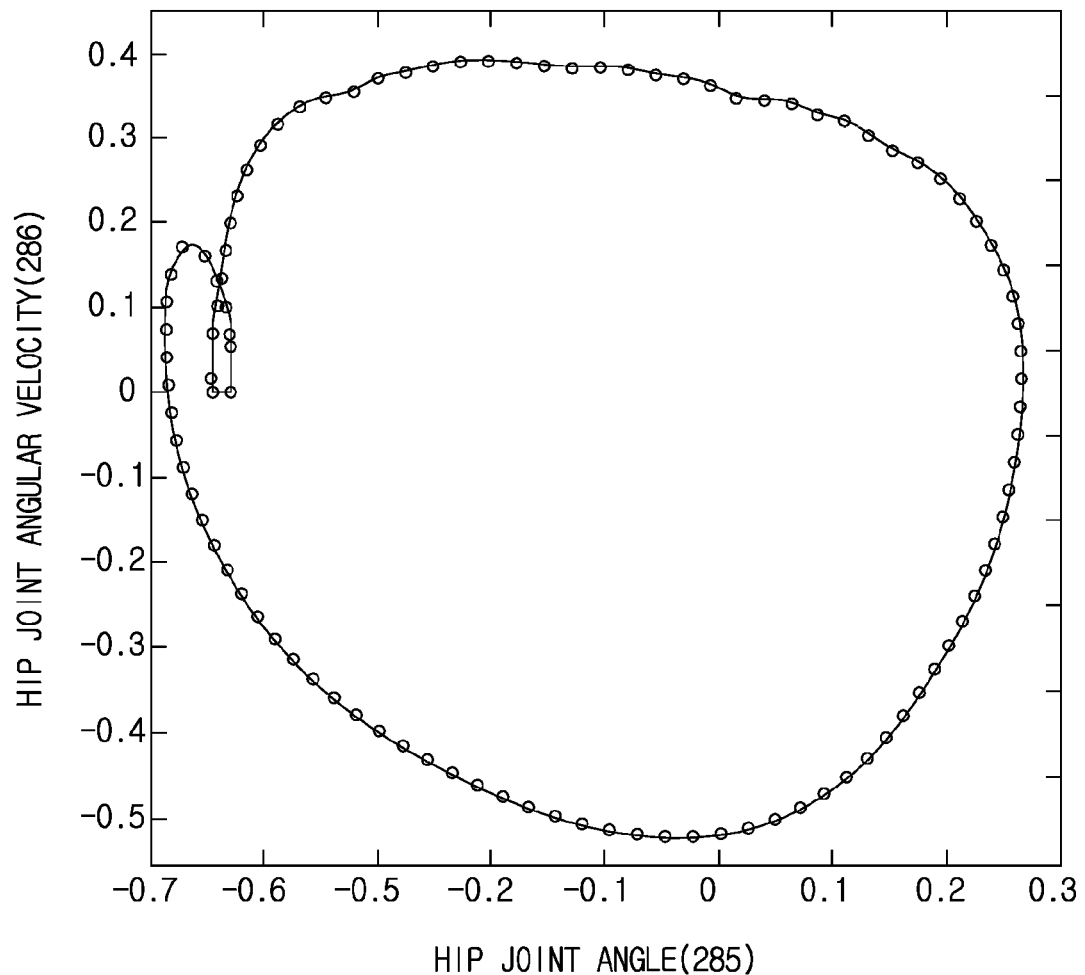
FIG. 6 is a graph of an embodiment in which a hip joint angular velocity is changed according to a hip joint angle.

FIG. 6 is a graph in which the hip joint angular velocity 286 is changed according to a hip joint angle 285 according to some example embodiments.

As illustrated in FIG. 6, a change of a hip joint angular velocity 286 during one walking cycle may be observed. A part in which the hip joint angular velocity 286 stops at 0 indicates a change of a hip joint movement direction while walking. A part in which the hip joint angle 285 is 0 indicates a time point at which the hip joint is perpendicular to the ground. As illustrated in FIG. 6, the hip joint angular velocity 286 may have the highest value at this time point.

Figure 7A:
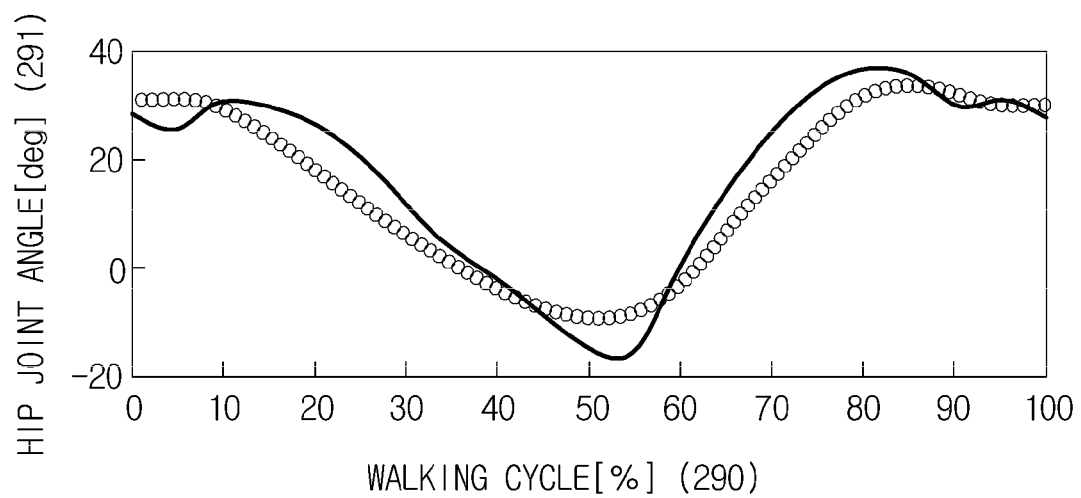
FIG. 7A is a graph of an embodiment illustrating a reference angle trajectory with respect to a hip joint during one walking cycle.
Figure 7B:
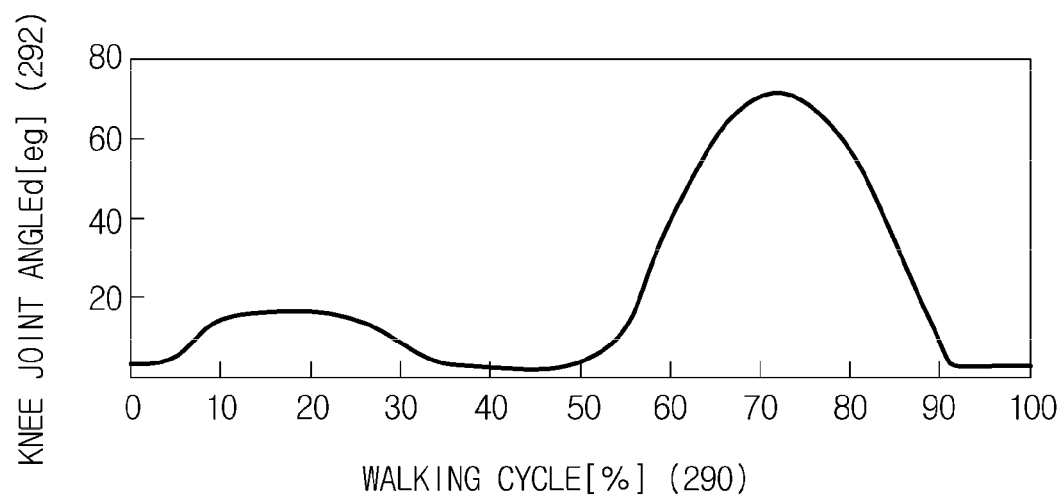
FIG. 7B is a graph illustrating a reference angle trajectory with respect to a knee joint during one walking cycle according to some example embodiments.
Figure 7C:
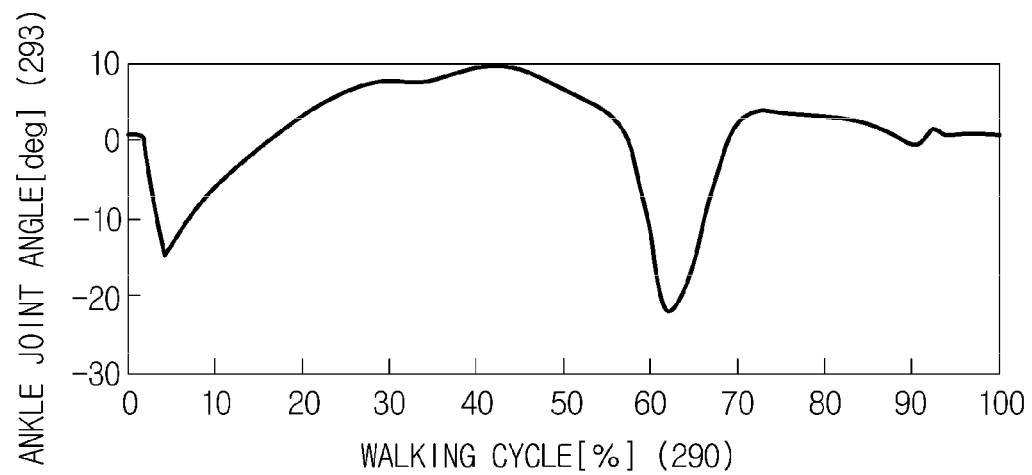
FIG. 7C is a graph illustrating a reference angle trajectory with respect to an ankle joint during one walking cycle according to some example embodiments.

FIG. 7A is a graph illustrating the reference angle trajectory with respect to the hip joint during one walking cycle according to some example embodiments. FIG. 7B is a graph of illustrating the reference angle trajectory with respect to the knee joint during one walking cycle according to some example embodiments. FIG. 7C is a graph illustrating the reference angle trajectory with respect to the ankle joint during one walking cycle according to some example embodiments.

As illustrated in FIGS. 7A, 7B, and 7C, reference angle trajectories of a hip joint, a knee joint, and an ankle joint stored in the PSAO may be observed.

In addition, the number of reference angle trajectories stored in the PSAO may be one or more according to the walking speed. For example, between two graphs illustrated in FIG. 7A, a graph indicated by a solid line shows a reference angle trajectory when the wearer is running (the walking speed is high) and it may be understood that a hip joint angle change of the reference angle trajectory is high. On the other hand, a graph indicated by a dotted line in FIG. 7A shows a reference angle trajectory when the wearer is walking (the walking speed is low) and it may be understood that a hip joint angle change of the reference angle trajectory is low.

Also, the reference angle trajectories stored in the PSAO may have different angle changes of the reference angle trajectories for each joint. For example, the reference angle trajectory of the hip joint in FIG. 7A, the reference angle trajectory of the knee joint in FIG. 7B, and the reference angle trajectory of the ankle joint in FIG. 7C may be differently represented during one walking cycle. This may be due to the fact that positions, functions, and forces from the ground of the hip joint, the knee joint, the ankle joint during one walking cycle are different for each joint.

After the reference angle trajectory is corrected to correspond to the measured hinge angle trajectory described above, the controller may determine the walking assistant torque based on the corrected reference angle trajectory and the controller may provide the determined assistant torque to the support frame.

In some example embodiments, when the controller determines the walking assistant torque, assistant torque data preset to correspond to the corrected reference angle trajectory may be used. A method of using the preset assistant torque data is as follows, however, example embodiments are not limited thereto. Assistant torque data in which an angle and assistant torque correspond one-to-one is stored in the form of a look-up table in the control unit. At the corrected reference angle trajectory, an angle corresponding to each time point and assistant torque corresponding one-to-one with each angle are found. The controller may determine that the found assistant torque is an assistant torque at a corresponding time point.

The assistant torque data preset to correspond to the corrected reference angle trajectory may have a plurality of forms. For example, the preset assistant torque data may include a plurality of pieces of assistant torque data that are classified for each walking speed of the wearer. Also, the preset assistant torque data may include a plurality of pieces of assistant torque data that are classified for each slope of the ground. Also, the preset assistant torque data may include a plurality of pieces of assistant torque data that are classified by age of the wearer. Also, the preset assistant torque data may include a plurality of pieces of assistant torque data that are classified by sex of the wearer. Also, the preset assistant torque data may include a plurality of pieces of assistant torque data that are classified by body weight of the wearer.

In addition, in some example embodiments, the controller may update the assistant torque data preset to correspond to the corrected reference angle trajectory to data of a current wearer. For example, the EMG measurement device of the detecting unit measures muscle movement by detecting an electrical change in the muscle from a muscle response in response to nerve stimulation while the current wearer is walking. This measured EMG data may be converted into data of a pattern of the muscle movement and updated to the data of the current wearer.

Also, the GRF is measured using visual tracking and a force plate, and the preset assistant torque data (look-up table) may be updated to data of the current wearer.

Figure 8:
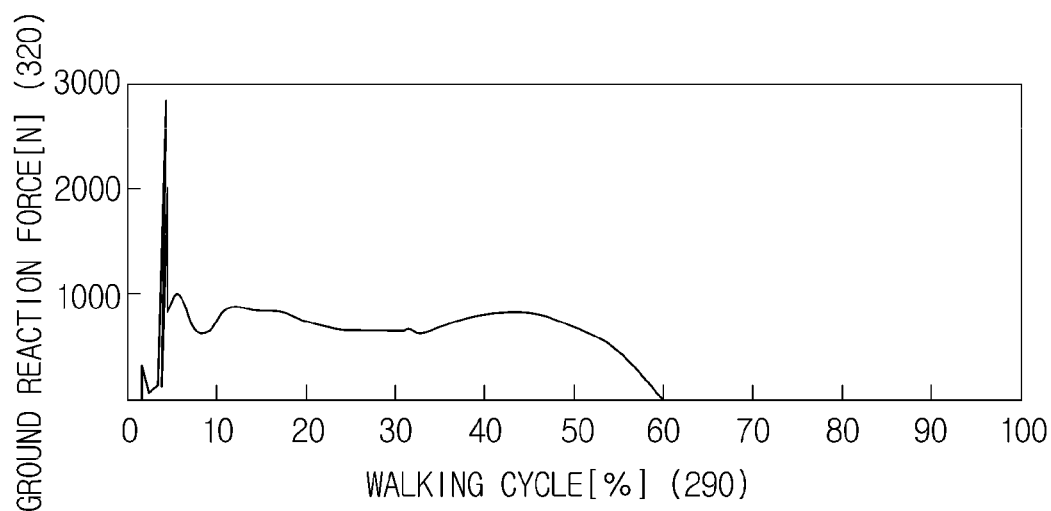
FIG. 8 is a graph of ground reaction force (GRF) during a walking cycle in which the GRF is measured using a force plate and the measured value is used as data for determining assistant torque according to some example embodiments.

FIG. 8 is a graph of GRF 320 during a walking cycle 290 in which the GRF 320 is measured using the force plate and the measured value is used as data for determining assistant torque.

As illustrated in FIG. 8, through the visual tracking and the force plate, the GRF of the wearer during one walking cycle in FIG. 8 is measured and this measured GRF may be updated to data of the current wearer.

Hereinafter, an example of the controller correcting a phase and a size of assistant torque corresponding to the walking phase calculated in the PSAO or the PCAO using an assistant level, and determining an output torque will be described with reference to FIGS. 9 to 11.

Figure 9:
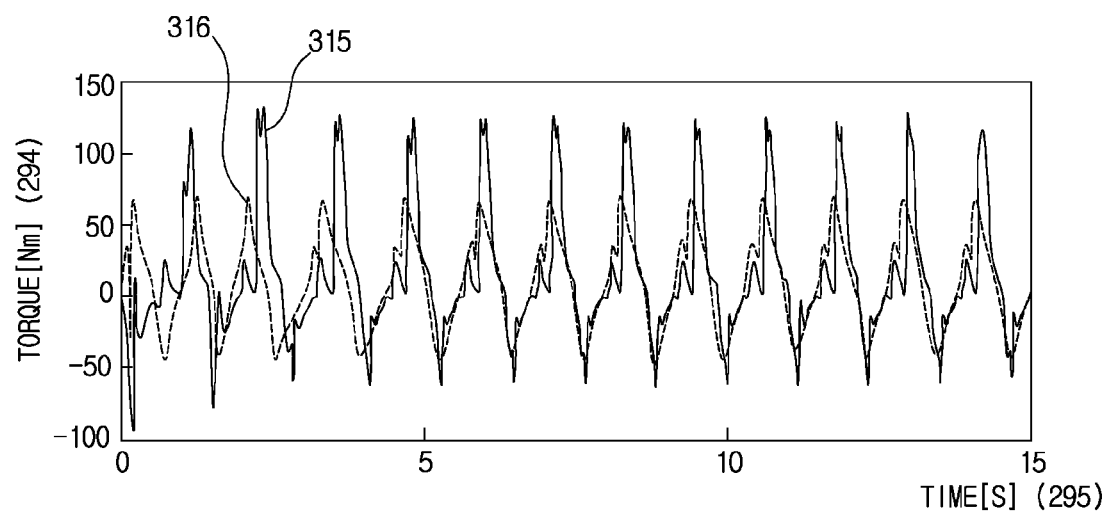
FIG. 9 is a graph illustrating comparison between walking assistant torque determined in an assistant torque determining unit of a control unit and torque necessary for walking according to some example embodiments.

FIG. 9 illustrates a graph of comparison between walking assistant torque 316 and torque necessary for walking 315.

As illustrated in FIG. 9, although timings of phases of the torque 315 necessary for walking and the provided walking assistant torque 316 do not match at the beginning of walking, as a correction cycle increases over a walking time 295, timings of phases that are starting points may match.

Figure 10:
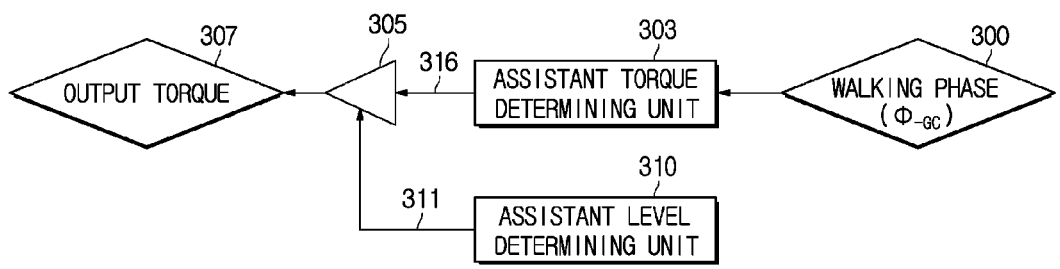
FIG. 10 is a diagram illustrating a concept of regulating output torque of a walking assistant device by multiplying assistant torque by an assistant level determined by a matching degree between hinge motion and the PSAO or the PCAO according to some example embodiments.

FIG. 10 illustrates a concept of the controller regulating output torque of a walking assistant device by multiplying assistant torque by an assistant level determined by a matching degree between hinge motion and the PSAO or the PCAO.

The controller may determine output torque 307 by multiplying an assistant level 311 determined by a matching degree of the PSAO or the PCAO by the assistant torque 316 determined by an assistant torque determining unit 303.

Specifically, an assistant level determining unit 310 may determine the assistant level 311 based on the error value between the hinge angle and the overlapping angle of the PSAO or the PCAO. The determined assistant level 311 may be a variable that indicates a ratio of the assistant torque 316 determined by the assistant torque determining unit 303 and the output torque 307 provided from the power unit to the support frame. The output torque 307 is determined by multiplying the assistant torque 316 determined by the assistant torque determining unit 303 by the assistant level 311 determined by the assistant level determining unit 310. Accordingly, when walking recognized in the PSAO or the PCAO and actual walking of the wearer do not match at the beginning of walking, it is possible to reduce the output torque 307 of the assistant torque 316. The assistant level 311 determined through the following Equations 15 and 16 may have a real value of 0 to 1.

$$A(n+1) = \begin{cases} A(n) + 2\pi f_1 T_s(0 - A(n)), & \text{if } |\varepsilon(n)| < A(n) \\ |\varepsilon(n)|, & \text{otherwise} \end{cases}$$ [Equation 15]

$$\gamma(n+1) = \begin{cases} \gamma(n) + 2\pi f_2 T_s(\gamma_{max} - \gamma(n)), & \text{if } A(n) < A_{tol} \\ \gamma(n) + 2\pi f_2 T_s(0 - \gamma(n)), & \text{otherwise} \end{cases}$$ [Equation 16]

In Equations 15 and 16, A is a filter value, $\gamma$ is an assistant level, $f_1$ is a frequency of the filter value A, and $f_2$ is a frequency of the assistant level $\gamma$.

In the assistant level as represented in Equations 15 and 16, the filter value A, that is sensitive to an increase of an absolute value of an error and insensitive to a decrease thereof, is calculated based on an absolute value of an error value $\varepsilon$ between an input signal and an overlapping wave of the PSAO, and the assistant level is calculated based on the calculated A.

Figure 11:
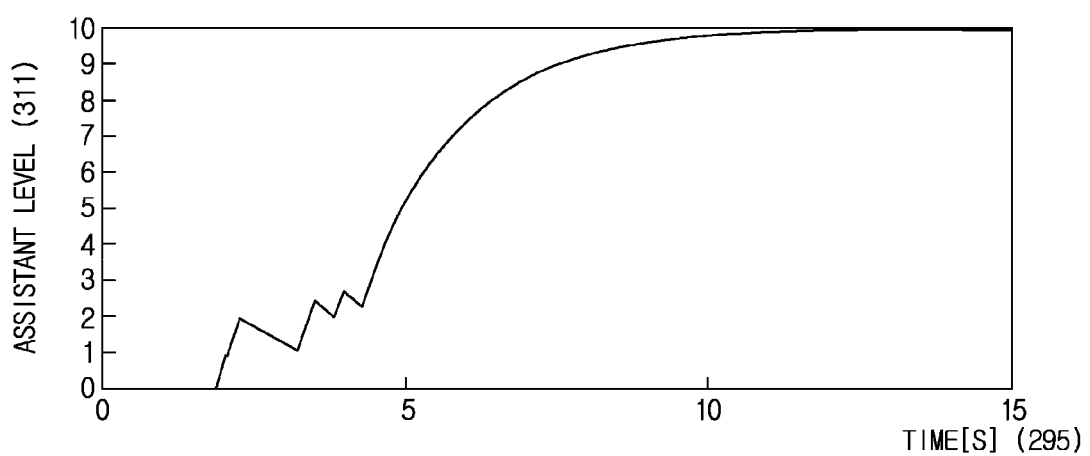
FIG. 11 is a graph illustrating a change of an assistant level over a walking time according to some example embodiments.

FIG. 11 is a graph illustrating a change of the assistant level 311 over the walking time 295 according to some example embodiments.

As illustrated in FIG. 11, it may be observed that the assistant level changes variously over the walking time 295.

Also, the walking assistant device according to some example embodiments may simply supplement insufficient torque when the wearer walks, and may also provide an exercise effect on muscles by providing torque opposite to torque necessary for the wearer's walking when other muscle enhancement such as rehabilitation is necessary. For example, the assistant torque for providing the exercise effect on muscles may be determined using reverse assistant torque data (look-up table) or by multiplying a negative assistant level.

Figure 12:
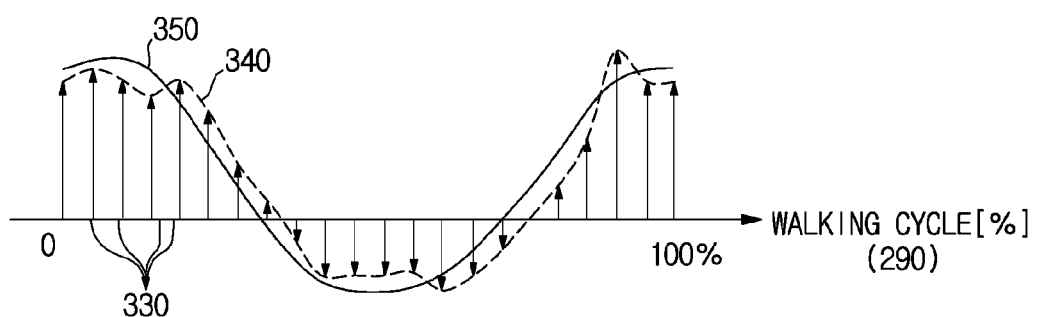
FIG. 12 is a diagram illustrating a concept of updating a hinge angle measured in previous walking to a reference angle trajectory according to some example embodiments.

As illustrated in FIG. 12, in some example embodiments, the reference trajectory may be updated to a hinge trajectory measured in a previous cycle.

FIG. 12 illustrates a concept of updating a hinge angle trajectory 340 measured in previous walking to a reference angle trajectory 350.

The control unit stores N sampled hinge angles 330 during one cycle at the same interval for every previous cycle, and may generate a pattern of the measured angle trajectory 340 of the hinge by connecting collected sampled measured hinge angles 330. Then, the control unit stores a new pattern generated by averaging the measured angle trajectories 340 of the hinge for each cycle as the stored hinge angle trajectory 350. This stored hinge angle trajectory 350 may be updated to the reference angle trajectory.

Figure 13:
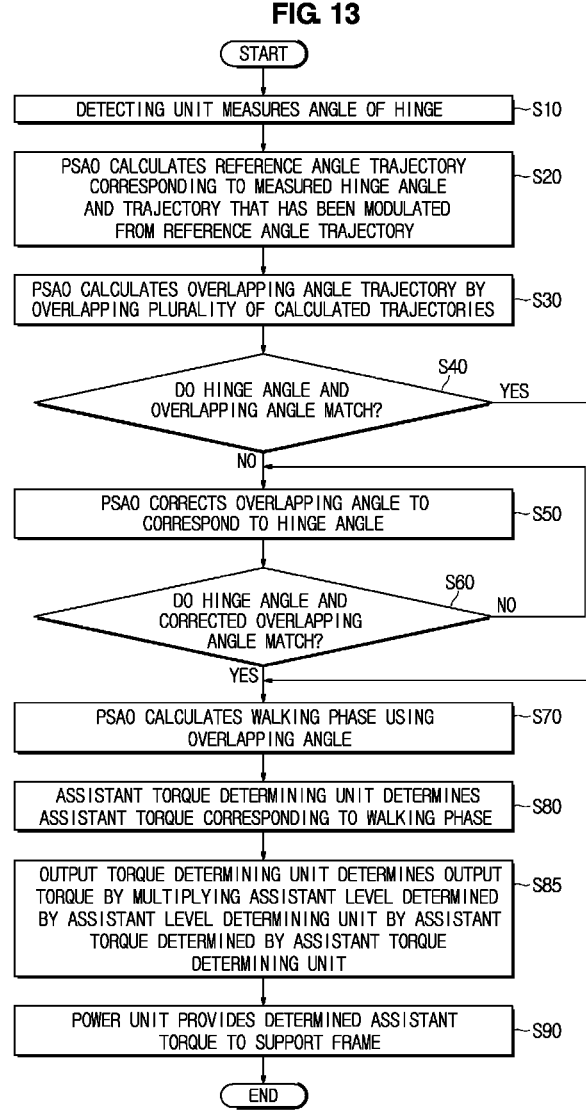
FIG. 13 is a flowchart illustrating a process of calculating of an overlapping angle trajectory corresponding to a measured hinge angle using a reference trajectory and a trajectory that has been modulated from the reference trajectory, and providing assistant torque corresponding to a walking phase that is a phase of a corrected angle trajectory obtained by correcting the overlapping angle trajectory.

FIG. 13 is a flowchart illustrating a process of calculating of an overlapping angle trajectory corresponding to a measured hinge angle using a reference trajectory and a trajectory that has been modulated from the reference trajectory, and providing assistant torque corresponding to a walking phase that is a phase of a corrected angle trajectory obtained by correcting the overlapping angle trajectory.

Referring to FIG. 13, the process may be performed by a detecting unit, a control unit, and a power unit. For example, the controller may be programmed with computer readable code that configured the controller to perform the process using detectors and drivers.

In operation S10, the detecting unit may measures the hinge angle and transmit the measurement to the controller, for example to the PSAO of the controller.

In operation S20, the controller may calculate a reference angle trajectory corresponding to the hinge angle received from the detecting unit and a trajectory that has been modulated from the reference angle trajectory.

In operation S30, the controller may overlap the plurality of calculated trajectories to calculate an overlapping angle trajectory.

In operation S40, the controller may determine whether the hinge angle matches the calculated overlapping angle.

When the hinge angle and the calculated overlapping angle do not match, in operation S50, the controller may correct the overlapping angle to correspond to the hinge angle, and in operation S60, the controller may determine whether the hinge angle matches the corrected overlapping angle.

When the hinge angle and the corrected overlapping angle do not match, the controller may again perform operation S50 such that the overlapping angle is corrected again to correspond to the hinge angle.

When the hinge angle and the calculated overlapping angle match or the hinge angle and the corrected overlapping angle match, in operation S70, the controller may calculate a current walking phase using the overlapping angle.

In operation S80, the controller may determine assistant torque corresponding to the walking phase.

In operation S85, the controller may determine output torque by multiplying an assistant level, which is determined by an error value between the overlapping angle and the hinge angle, by the determined assistant torque.

Finally, in operation S90, a power unit, for example, one or more of the drivers, may provide the output torque determined by the output torque determining unit to a support frame and the controller may terminate an operation of a walking assistant device.

In example embodiments, the main body 10 of walking assistant device 1 may include a controller. The controller may include a processor and a memory (not shown).

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the controller as a special purpose computer to perform the operations illustrated in FIG. 13, such that the controller is configured to calculate a walking phase using joint motion of the wearer and provide an assistant torque corresponding to the calculated walking phase. The controller may be configured to calculate the walking phase by correcting an overlapping angle trajectory. The controller may perform the operations illustrated in FIG. 13 using equations 1-16 discussed above.

The instructions may program the controller to perform the functions of, at least one or more of a walking phase calculating unit, an assistant torque determining unit, a walking speed calculating unit and a slope estimating unit.

The instructions may be stored on a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors.

According to some example embodiments, in the walking assistant device and the method of controlling the walking assistant device described above, the controller may calculate a walking phase by measuring only joint motion of a wearer without a force/torque sensor (F/T sensor) positioned on a foot and assistant torque may be provided from the calculated walking phase. Also, the controller may reduce a time delay between measurement and providing the assistant torque through signal processing of correcting the reference trajectory by comparing the measured joint motion and the reference trajectory, as compared to a method of directly using the measured joint motion.

The above description is only an example. Various changes, modifications, and replacements may be made without departing from the spirit and scope of the example embodiments by those skilled in the art. Therefore, the example embodiments disclosed and the accompanying drawings should be considered in a descriptive sense only and not for limiting the technological scope of the example embodiments. The technological scope of the example embodiments is not limited by these example embodiments and the accompanying drawings. The spirit and scope of the example embodiments should be interpreted by the appended claims and encompass all equivalents falling within the scope of the appended claims.

What is claimed is:

1. A method of controlling a walking assistant device, comprising:
   measuring, via one or more detectors, motion of a hinge, the hinge having support frames connected thereto;
   determining, via a controller, a reference trajectory corresponding to the measured motion of the hinge and at least one modulation trajectory that is modulated from the reference trajectory;
   overlapping, via the controller, the reference trajectory corresponding to the measured motion of the hinge and the at least one modulation trajectory to form at least one overlapping trajectory;
   determining, via the controller, whether the measured motion of the hinge matches the at least one overlapping trajectory;
   correcting, via the controller, the at least one overlapping trajectory to form at least one corrected overlapping trajectory such that the at least one corrected overlapping trajectory corresponds to the measured motion of the hinge, and determining whether the measured motion of the hinge matches the at least one corrected overlapping trajectory, in response to determining that the measured motion of the hinge and the at least one overlapping trajectory do not match;
   determining, via the controller, a walking phase using the at least one corrected overlapping trajectory in response to determining that the measured motion of the hinge and the at least one corrected overlapping trajectory match;
   determining, via the controller, an assistant torque corresponding to the determined walking phase using stored assistant torque data that corresponds to the at least one corrected overlapping trajectory;
   determining, via the controller, an assistant level based on an error value obtained by comparing the measured motion of the hinge and the at least one overlapping trajectory;
   determining, via the controller, an output torque based on the determined assistant torque and the determined assistant level, such that the determined assistant torque is reduced based on the error value; and
   generating, via one or more drivers, the determined output torque, and providing the generated output torque to one or more of the support frames via the hinge.

2. The method according to claim 1, wherein:
   the at least one overlapping trajectory includes a first overlapping trajectory and a second overlapping trajectory, and the at least one corrected overlapping trajectory includes a corrected first overlapping trajectory and a corrected second overlapping trajectory,
   the overlapping includes overlapping, through trigonometric functions, the measured motion of the hinge as the first overlapping trajectory and a reference motion corresponding to the measured motion of the hinge as the second overlapping trajectory, and
   the correcting includes,
      correcting the first overlapping trajectory to form the corrected first overlapping trajectory such that the corrected first overlapping trajectory corresponds to the measured motion of the hinge, and
      correcting the second overlapping trajectory to form the corrected second overlapping trajectory such that the corrected second overlapping trajectory corresponds to the reference motion, and the determining the walking phase includes comparing the corrected first overlapping trajectory and the corrected second overlapping trajectory.

3. The method according to claim 1, wherein the measuring the motion of the hinge includes measuring an angle of the hinge.

4. The method according to claim 1, further comprising:
measuring a walking acceleration, a walking speed, and a slope of an upper body of a wearer of the walking assistant device.

5. The method according to claim 1, further comprising:
calculating a walking speed using the measured motion of the hinge.

6. The method according to claim 3, further comprising:
estimating a slope of a ground by comparing the measured angle of the hinge and angle data associated with the hinge.

7. A walking assistant device, comprising:
a support frame having a first support frame and a second support frame, the first support frame being connected to the second support frame by a hinge;
a detector provided in the hinge, the detector configured to measure a motion of the hinge;
a controller configured to,
    determine a reference trajectory corresponding to the measured motion of the hinge and at least one modulation trajectory that is modulated from the reference trajectory,
    overlap the reference trajectory corresponding to the measured motion of the hinge and at least one modulation trajectory to form at least one overlapping trajectory,
    determine whether the measured motion of the hinge matches the at least one overlapping trajectory,
    correct the at least one overlapping trajectory to form at least one corrected overlapping trajectory such that the at least one corrected overlapping trajectory corresponds to the measured motion of the hinge, and determine whether the measured motion of the hinge matches the at least one corrected overlapping trajectory, in response to determining that the measured motion of the hinge and the at least one overlapping trajectory do not match,
    determine a walking phase using the at least one corrected overlapping trajectory in response to determining that the measured motion of the hinge and the at least one corrected overlapping trajectory match,
    determine an assistant torque corresponding to the determined walking phase using stored assistant torque data that corresponds to the at least one corrected overlapping trajectory,
    determine an assistant level based on an error value obtained by comparing the measured motion of the hinge and the at least one overlapping trajectory, and
    determine an output torque based on the determined assistant torque and the determined assistant level, such that the determined assistant torque is reduced based on the error value; and
a driver configured to generate the determined output torque, and provide the generated output torque to the support frame via the hinge.

8. The device according to claim 7, wherein:
the at least one overlapping trajectory includes a first overlapping trajectory and a second overlapping trajectory, and the at least one corrected overlapping trajectory includes a corrected first overlapping trajectory and a corrected second overlapping trajectory, and
the controller is configured to,
    overlap, through trigonometric functions, the measured motion of the hinge and a reference motion corresponding to the measured motion of the hinge as the first overlapping trajectory and the second overlapping trajectory, respectively,
    correct the first overlapping trajectory to form the corrected first overlapping trajectory such that the corrected first overlapping trajectory corresponds to the measured motion of the hinge,
    correct the second overlapping trajectory to form the corrected second overlapping trajectory such that the corrected second overlapping trajectory corresponds to the reference motion, and
    determine the walking phase by comparing the corrected first overlapping trajectory and the corrected second overlapping trajectory.

9. The device according to claim 7, wherein the detector is configured to measure the motion of the hinge by measuring an angle of the hinge.

10. The device according to claim 7, wherein the support frame is configured to be positioned on at least one of a hip joint, a knee joint, and an ankle joint of a wearer of the walking assistance device.

11. The device according to claim 7, wherein the detector is configured to measure a walking acceleration, a walking speed, and a slope of an upper body of a wearer of the walking assistance device.

12. The device according to claim 7, wherein the controller is configured to calculate a walking speed using the measured motion of the hinge.

13. The device according to claim 9, wherein the controller is configured to estimate a slope of a ground by comparing the measured angle of the hinge and angle data associated with the hinge.

14. The device according to claim 7, wherein the assistant torque data includes at least one of assistant torque data related to a walking speed, assistant torque data related to a slope of a ground, assistant torque data related to an age group, assistant torque data related to a sex of a wearer, assistant torque data related to a body weight of the wearer, reverse assistant torque data, and
    wherein the controller is configured to update the assistant torque data based on the wearer.

15. The device according to claim 7, wherein
the hinge includes a left hinge and a right hinge,
the detector is configured to measure motion of only a first one of the left hinge and the right hinge, and
the controller is configured to determine assistant torque of the first one and a second one of the left hinge and the right hinge.

16. The device according to claim 7, wherein the controller is configured to update the reference trajectory to a previously measured motion of the hinge.

* * * * *